United States Patent
Ochoa

(10) Patent No.: US 7,878,486 B2
(45) Date of Patent: Feb. 1, 2011

(54) RELEASABLE HIGHWAY SAFETY STRUCTURES

(75) Inventor: Carl M. Ochoa, 5901 Sandhills Cir., Plano, TX (US) 75093

(73) Assignee: Carl M. Ochoa, Plano, TX (US)

( * ) Notice: Subject to any disclaimer, the term of this patent is extended or adjusted under 35 U.S.C. 154(b) by 0 days.

(21) Appl. No.: 12/399,651

(22) Filed: Mar. 6, 2009

(65) Prior Publication Data

US 2009/0194752 A1    Aug. 6, 2009

Related U.S. Application Data

(62) Division of application No. 11/180,381, filed on Jul. 13, 2005, now Pat. No. 7,530,548.

(60) Provisional application No. 60/589,193, filed on Jul. 19, 2004.

(51) Int. Cl.
*E01F 15/00* (2006.01)
(52) U.S. Cl. .............. 256/13.1; 403/2; 404/10
(58) Field of Classification Search ............ 256/13.1; 403/2; 411/398, 399, 409; 404/10
See application file for complete search history.

(56) References Cited

U.S. PATENT DOCUMENTS

| | | | |
|---|---|---|---|
| 1,849,167 A | 11/1930 | Bente | |
| 1,950,965 A * | 3/1934 | Blackburn | 256/13.1 |
| 1,969,885 A * | 8/1934 | Irons et al. | 256/13.1 |
| 1,989,763 A | 2/1935 | McFarland | |
| 2,047,436 A | 7/1936 | Shepherd | |
| 2,047,990 A | 7/1936 | Carswell | |
| 2,776,116 A | 1/1957 | Brickman | |
| 2,942,853 A | 6/1960 | Glaros | |
| 2,979,307 A | 4/1961 | Crone | |
| 2,988,332 A | 6/1961 | Binetti et al. | |
| 3,032,281 A * | 5/1962 | Wexell | 411/399 |
| 3,207,478 A | 9/1965 | St. Pierre | |
| 3,241,423 A | 3/1966 | Davis | |
| 3,493,213 A | 2/1970 | Ackerman | |
| 3,519,249 A | 7/1970 | Nave | |
| 3,617,076 A | 11/1971 | Attwood et al. | |
| 3,828,422 A | 8/1974 | Schmitt | |
| 3,921,364 A | 11/1975 | Briles | |
| 4,010,671 A | 3/1977 | Hubbard et al. | |
| 4,050,833 A | 9/1977 | Briles | |
| 4,157,725 A | 6/1979 | Stanaitis | |
| 4,330,106 A | 5/1982 | Chisholm | |
| 4,432,172 A | 2/1984 | Kuykendall et al. | |
| 4,460,161 A | 7/1984 | Grenga | |
| 5,028,166 A | 7/1991 | Leishman | |
| 5,044,609 A | 9/1991 | Cicinnati et al. | |
| 5,069,576 A | 12/1991 | Pomero | |
| 5,169,127 A | 12/1992 | Eynard | |
| 5,172,891 A | 12/1992 | Chen | |
| 5,195,727 A | 3/1993 | Liao et al. | |
| 5,203,543 A | 4/1993 | Fleury | |
| 5,286,137 A | 2/1994 | Cicinnati | |
| 5,544,928 A | 8/1996 | Mori et al. | |

(Continued)

*Primary Examiner*—Michael P Ferguson
(74) *Attorney, Agent, or Firm*—Browning Bushman P.C.

(57) ABSTRACT

Consistent and reliable releasing of a guardrail during a vehicle impact is enabled by a releasable fastener for safety structures along a highway. The release of secured components such as guardrail is controlled, and precise positional cooperation is provided between securing members and the guardrail. Forces may be attenuated to further optimize response.

14 Claims, 16 Drawing Sheets

U.S. PATENT DOCUMENTS

| | | |
|---|---|---|
| 5,657,966 A | 8/1997 | Cicinnati |
| 5,954,111 A | 9/1999 | Ochoa |
| 5,988,598 A | 11/1999 | Sicking et al. |
| 6,007,269 A | 12/1999 | Marinelli |
| 6,024,341 A | 2/2000 | Gertz |
| 6,082,429 A | 7/2000 | Ochoa |
| 6,116,805 A | 9/2000 | Gertz |
| 6,168,346 B1 | 1/2001 | Ernsberger |
| 6,220,575 B1 | 4/2001 | Lindsay et al. |
| 6,234,437 B1 | 5/2001 | Cabo |
| 6,234,708 B1 | 5/2001 | Beck et al. |
| 6,250,360 B1 | 6/2001 | Ochoa |
| 6,250,361 B1 | 6/2001 | Ochoa |
| 6,290,427 B1 | 9/2001 | Ochoa |
| 6,398,192 B1 | 6/2002 | Albritton |
| 6,416,247 B2 | 7/2002 | Beck et al. |
| 6,428,080 B1 | 8/2002 | Ochoa |
| 6,484,464 B1 | 11/2002 | Ochoa |
| 6,488,268 B1 | 12/2002 | Albritton |
| 6,533,249 B2 | 3/2003 | Ochoa |
| 6,575,434 B2 | 6/2003 | Bligh et al. |
| 6,644,888 B2 | 11/2003 | Ochoa |
| 6,758,627 B2 | 7/2004 | King |
| 6,783,116 B2 | 8/2004 | Albritton |
| 6,793,204 B2 | 9/2004 | Albritton |
| 6,854,716 B2 | 2/2005 | Bronstad |
| 6,866,253 B1 | 3/2005 | Hopper |
| 6,902,150 B2 | 6/2005 | Alberson et al. |
| 2002/0053664 A1 | 5/2002 | Moore |
| 2005/0152743 A1 | 7/2005 | Kasraie |
| 2007/0063177 A1 | 3/2007 | Alberson et al. |
| 2007/0063178 A1 | 3/2007 | Alberson et al. |
| 2007/0063179 A1 | 3/2007 | Alberson et al. |
| 2007/0215849 A1 | 9/2007 | Alberson et al. |

* cited by examiner

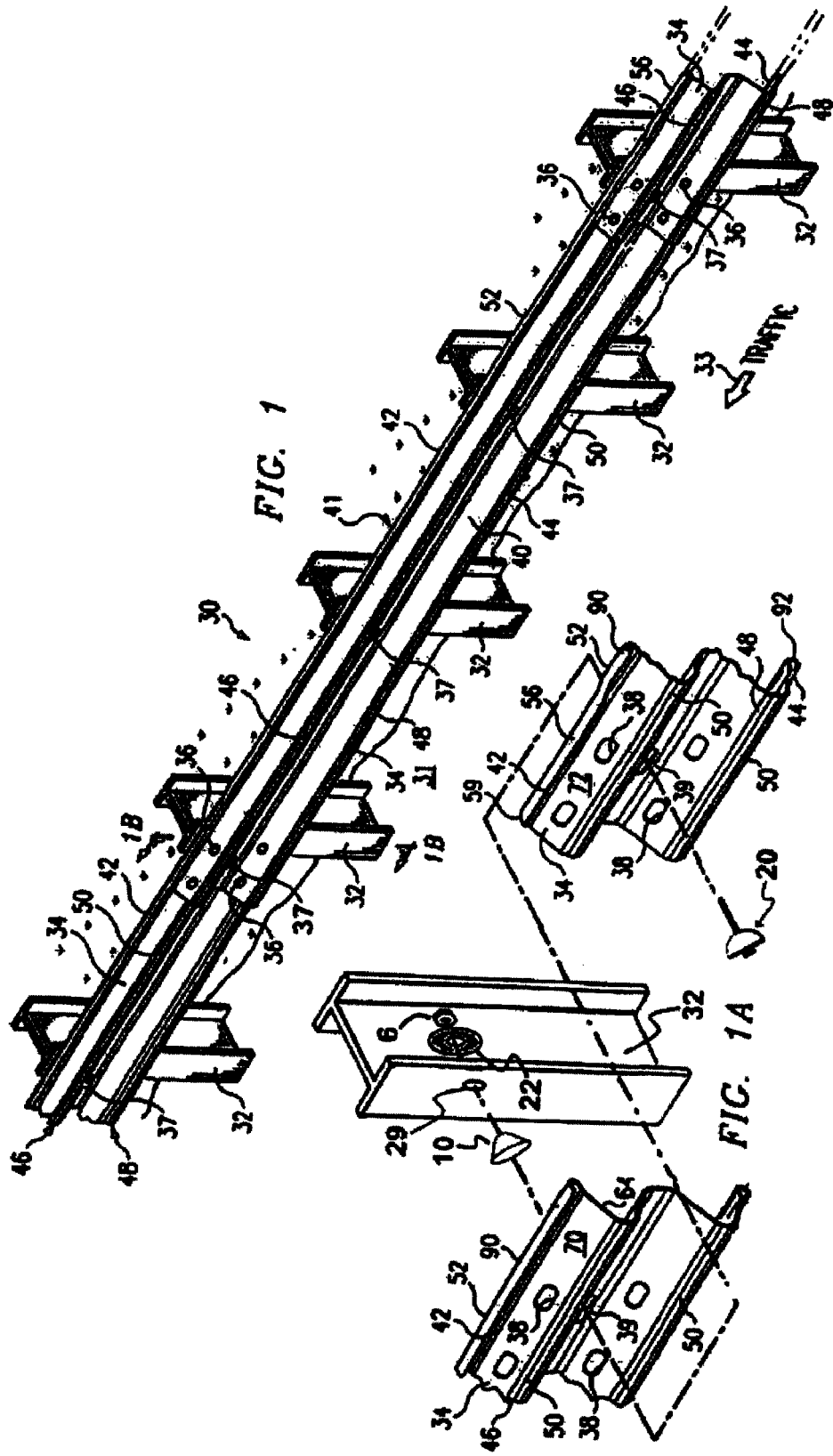

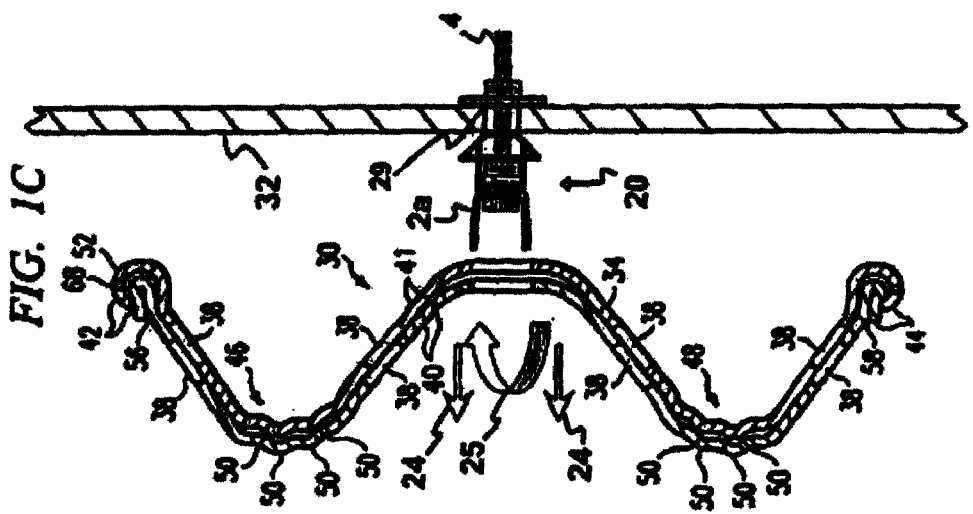
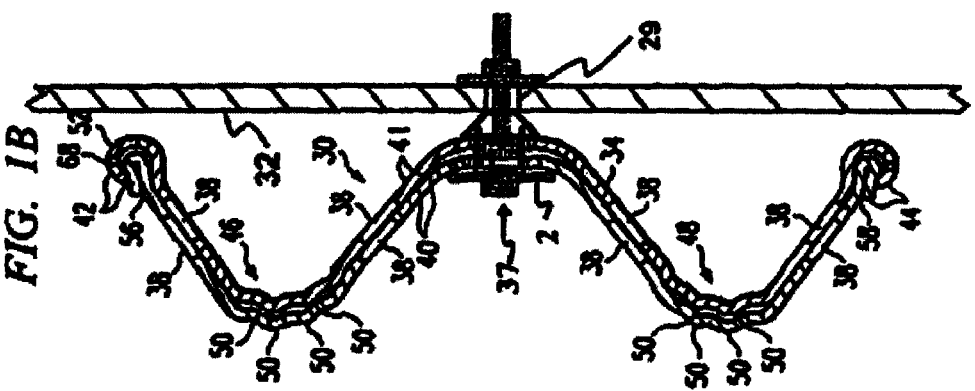

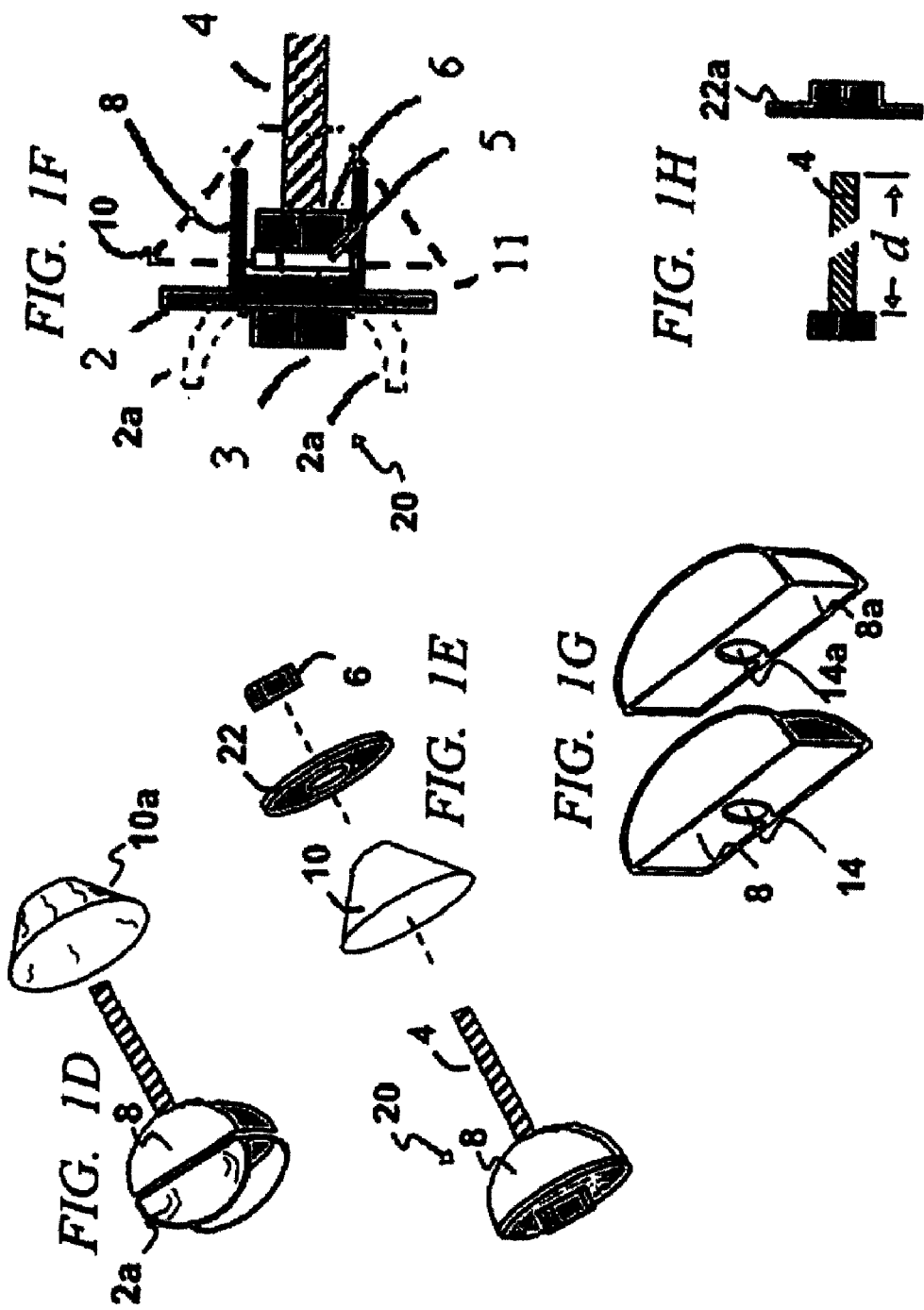

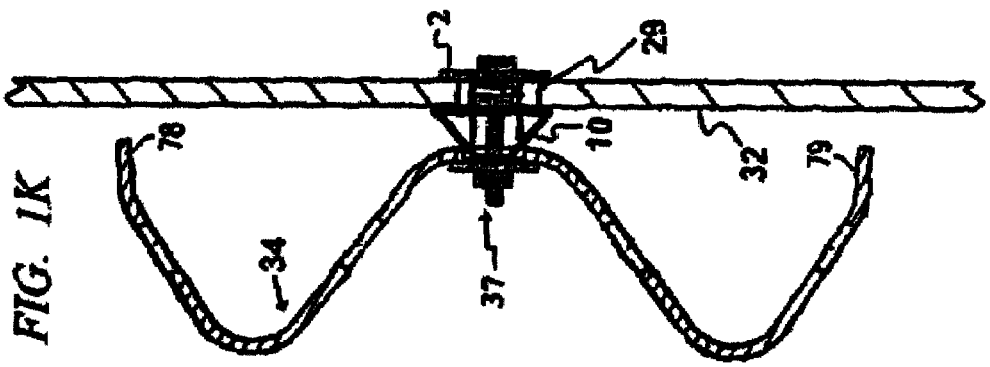
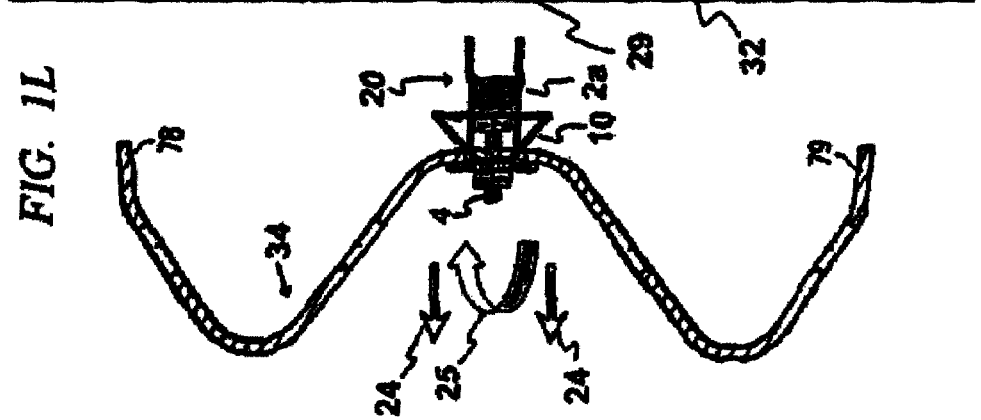

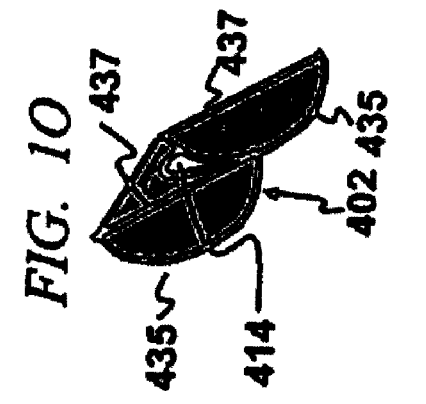
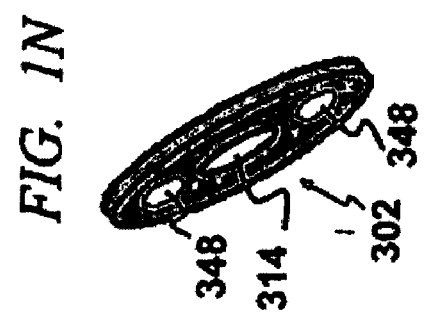
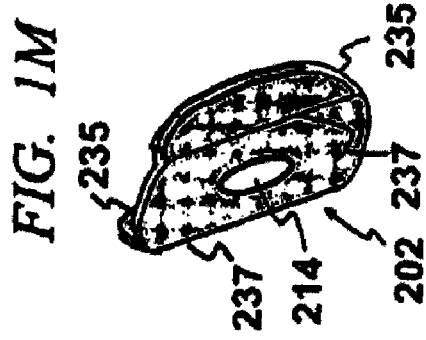
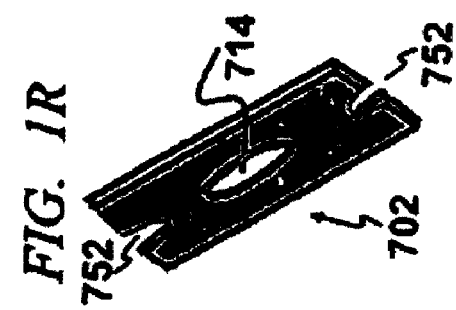
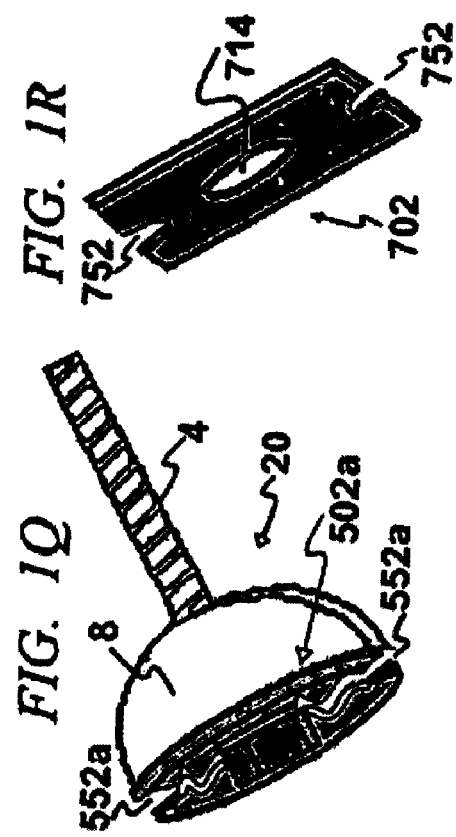
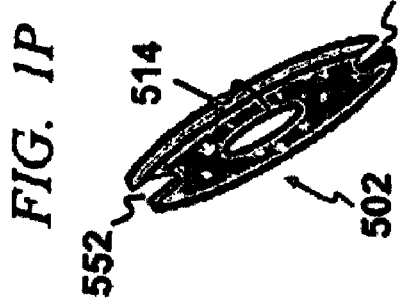

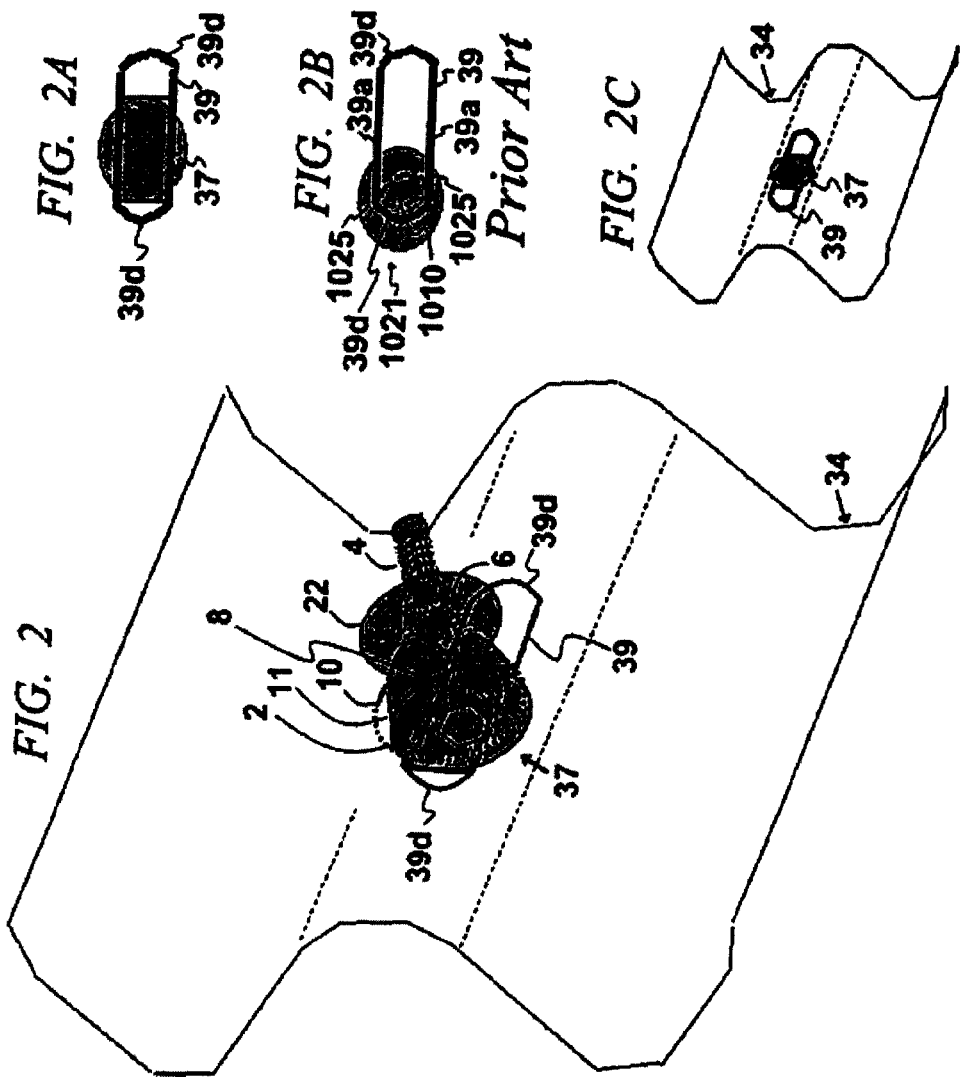

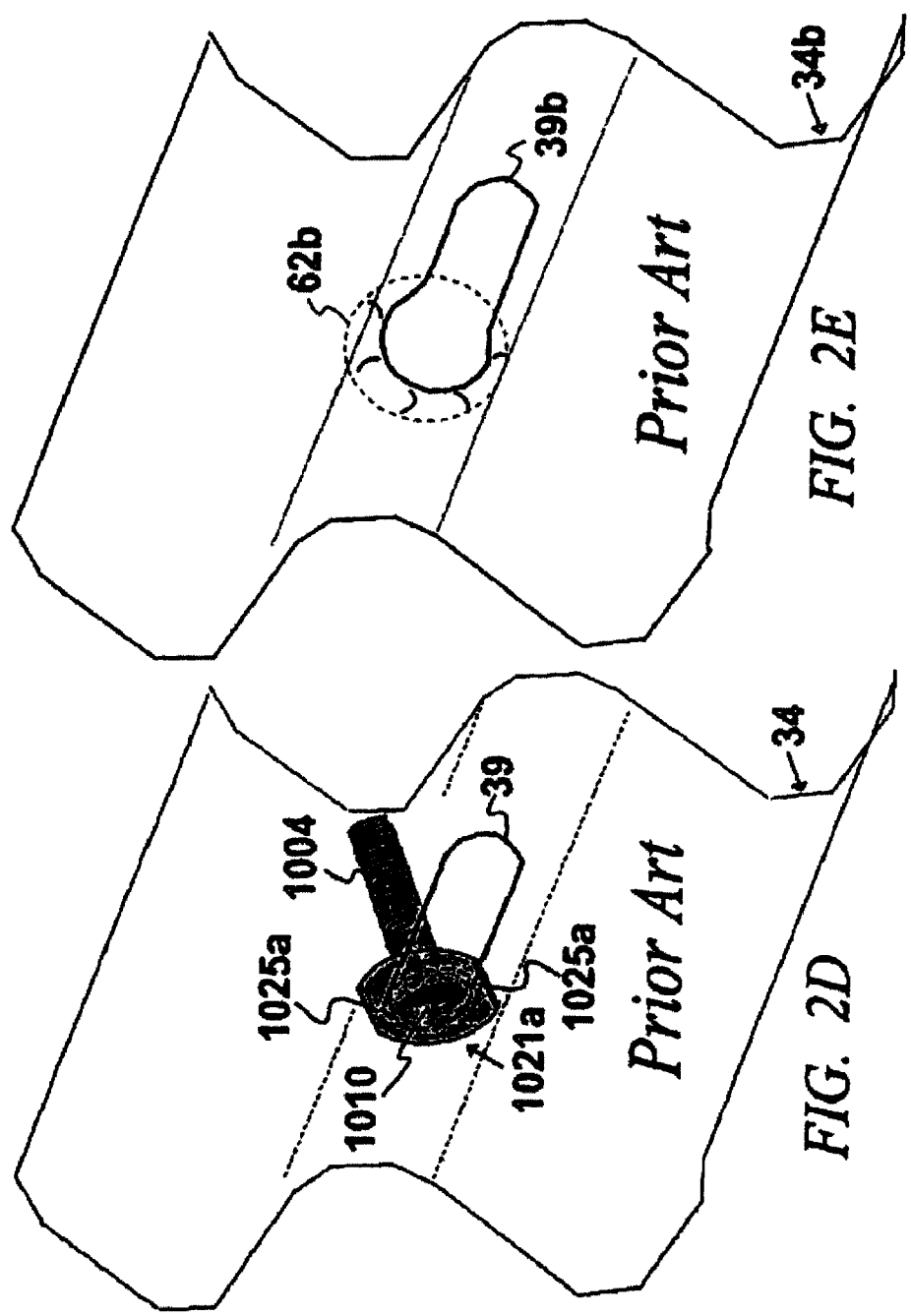

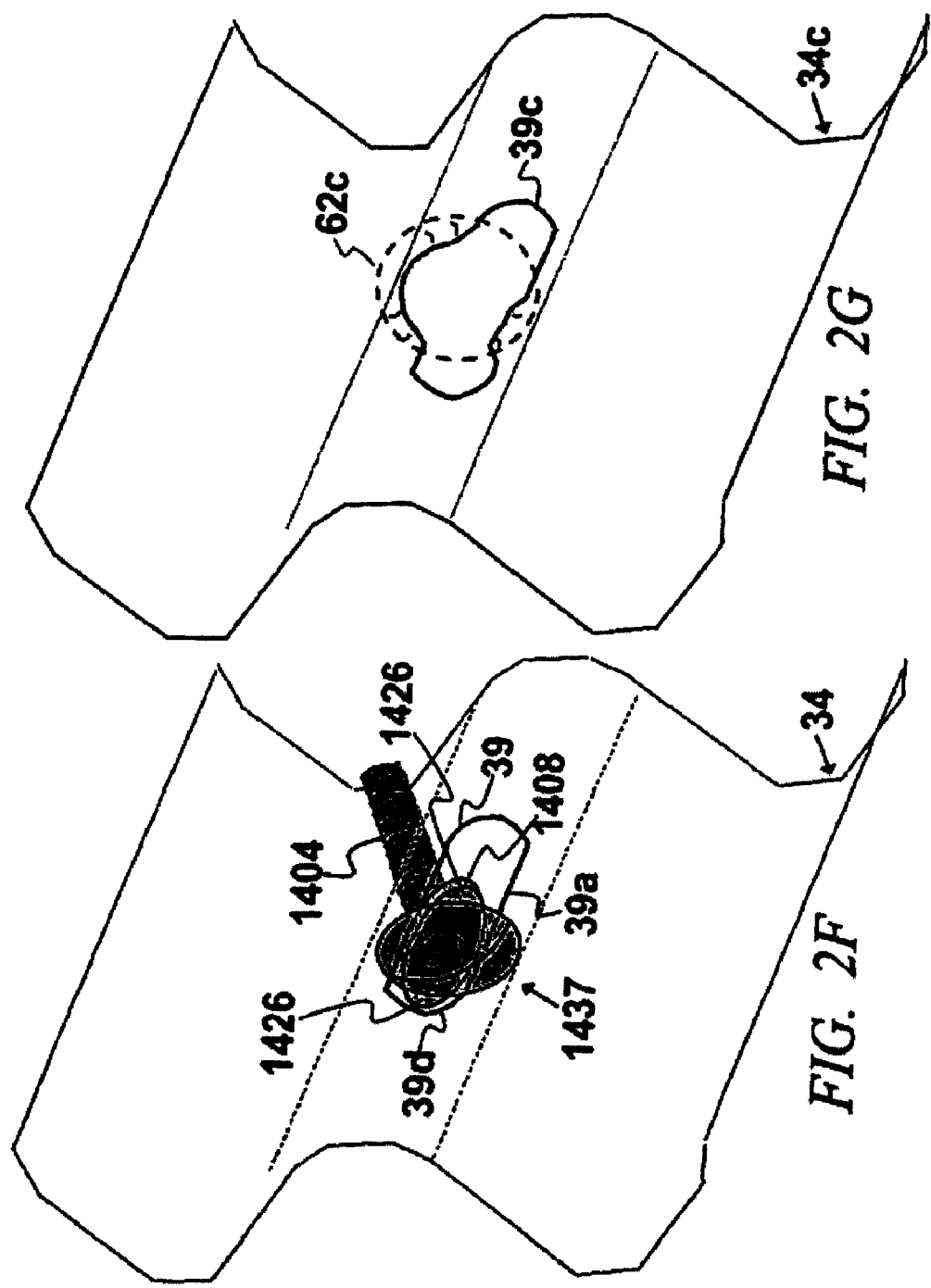

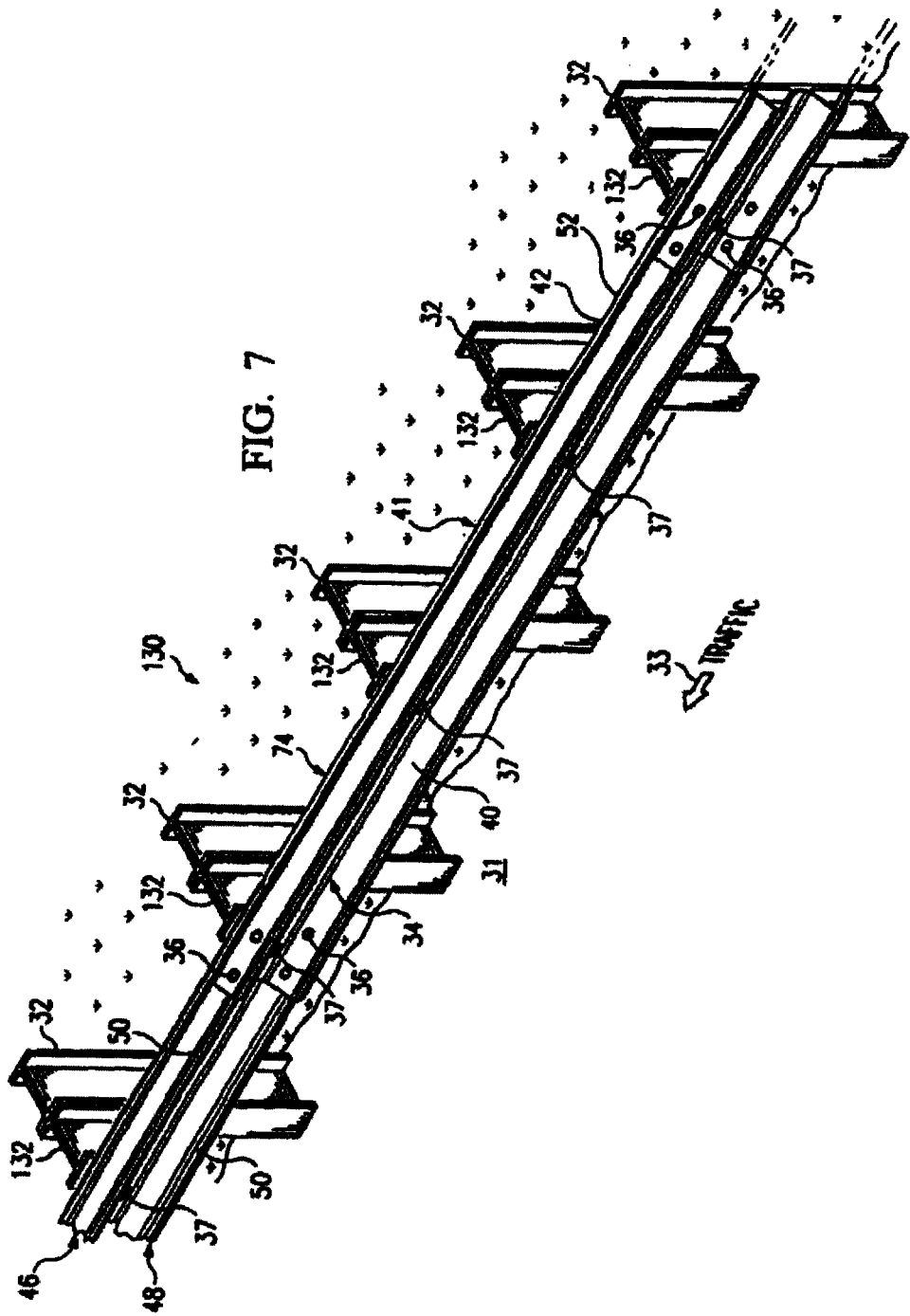

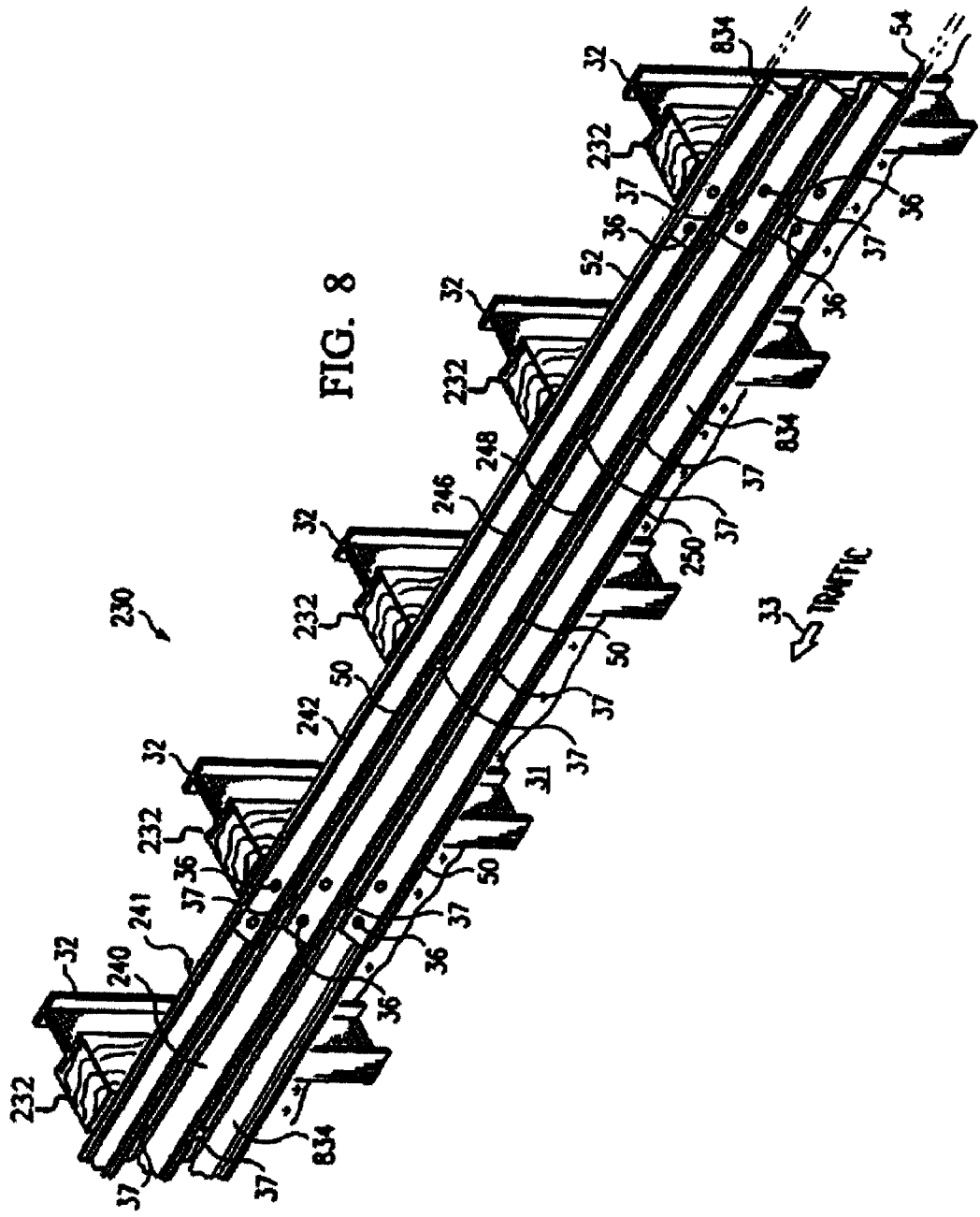

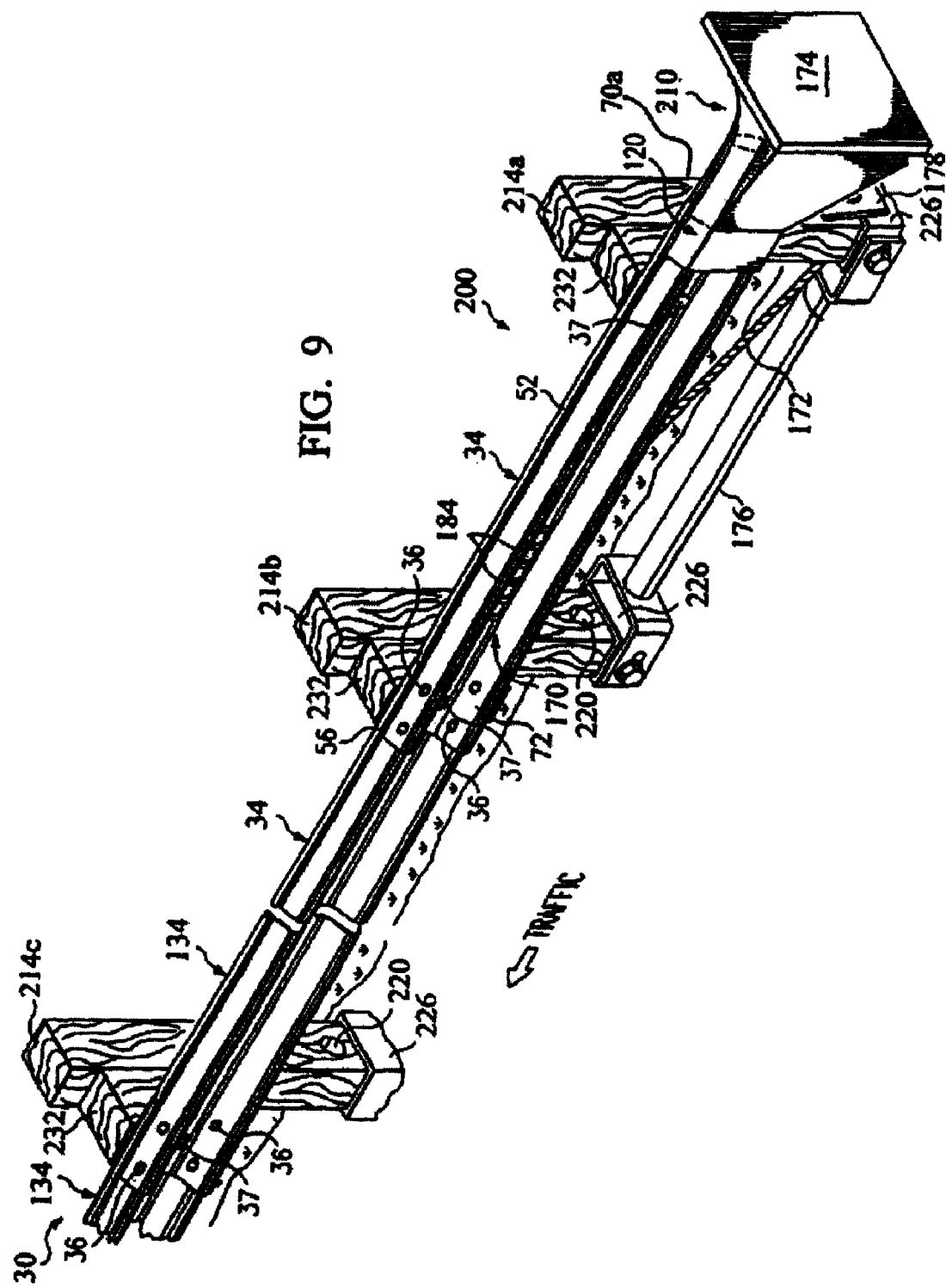

RELEASABLE HIGHWAY SAFETY STRUCTURES

CROSS REFERENCE TO RELATED APPLICATION

This application is a divisional of U.S. Non-provisional application Ser. No. 11/180,381 filed Jul. 13, 2005, now U.S. Pat. No. 7,530,548 which claims priority from and incorporates herein U.S. Provisional Application No. 60/589,193 filed Jul. 19, 2004.

FIELD OF THE INVENTION

The present invention relates generally to roadway safety devices and, more particularly, to the prescribed release of guardrail system components.

BACKGROUND OF THE INVENTION

A goal of roadway safety is to provide a forgiving roadway and adjacent roadside for errant motorists. Guardrails are employed along a roadside to accomplish multiple tasks. Upon vehicle impact, a guardrail must react as a decelerator and energy absorber to dissipate the kinetic energy of the vehicle. In addition, the guardrail acts as a mechanical guide to redirect the vehicle away from hazards during deceleration and to prevent the vehicle from leaving the road, being snagged by the guardrail system itself or from becoming airborne or rebounding excessively into traveled lanes of traffic.

For many years, various methods for the releasable mounting of guardrail system components have included the use of bolts that may fail (such as by stripping of the threads), break, or deform in a variety of relatively unreliable ways to accomplish the release of structural components. In some systems, a bolt is included that may sometimes shear and break, and at other similar times may deform as a washer passes through the post bolt slot of a guardrail panel to accomplish release. The washer sometimes pulls through the post bolt slot near the middle of the slot, and at other times pulls through the slot near an end of the slot, with quite significantly different release loads associated with each of these variations. In summary, the range of load types and magnitudes associated with each of these relatively unmanaged mechanisms may vary quite widely. With this, the actual release mode (the way that release is accomplished) has not been controlled or consistent, since it has not been unique or highly repeatable.

The reality has been that one of several release modes, or their various combinations, may actually cause release, depending upon a random combination of various extraneous variables that are also not well controlled during release. One example of release variables that are not well controlled in some guardrail systems involves bolt strengths. These are typically specified to be minimum values, such that actual bolt strengths may or may not be much higher. Details of bolt strength characteristics are typically only very roughly controlled. This means that there are extraneous combinations of various types of loads and geometric details that can and do occur. Moreover, each of these extraneous variables are further acted upon by installation details such as bolt position at the post bolt slot of a guardrail panel, and the tightness (torque) of a bolt when it is installed. These extraneous variables are all typical of weak post systems common in the United States.

In other guardrail systems, such as strong post systems, a block is provided between the guardrail and the post that pivots on the post in various ways, depending on actual guardrail forces and which side of the post the bolt is installed on, but generally providing various possible combinations of mechanical lever arms and respective fulcrums whereby the initially straight post bolt is bent and deformed, thus causing the solid head of the post bolt to pass through the post bolt slot, deforming the slot to accomplish the release of the guardrail panel from the post. Here again, the actual release mode is relatively unmanaged, and may vary widely. One very significant factor in some of these systems is whether the bolt head of the 5/8 inch diameter buttonhead bolt happens to pull through the guardrail post bolt slot near the center, or near an end of the slot. The difference in force magnitudes between these extremes may be as much as 60%. Moreover, this assumes that one is considering only the variation between extremes relative to a single ply of guardrail. The extremes are considerably wider when one compares the forces of a bolt pulling through the center of the slot of a single ply with the forces required to pull through the slot edge where there are two plies, such as at a splice, in which case the variation may be as much as 200 percent or more.

One common problem with these mounting methods has been the failure to achieve a reliable and repeatable release of the guardrail from the post even under relatively ordinary circumstances. The extremes of behavior in the prior art thus range between the adequate, to cases where the bolt head snags hard on one end of the post bolt slot, such that release may not occur at all. When effective release fails to occur, the guardrail may remain attached to a post far beyond optimum timing during a crash event.

The full importance of having a reliable and repeatable release mechanism has not been completely appreciated or understood in the highway safety industry. The result has been that errant vehicles struggle with the guardrail system in various ways during vehicle impacts rather than being smoothly redirected, simply due to inconsistent and relatively erratic release of components from each other during the vehicle impact event. The actual symptoms of unreliable release have been so commonly observed during vehicle crash tests that they have been categorized over the years by experienced crash testing engineers as vehicle vaulting, vehicle pocketing, or hard snagging of the vehicle wheel on various components such as posts. Significant suspension damage or occupant compartment deformation may also occur to the vehicle due to inadequate release. The vehicle itself may actually be destabilized by the action of excessive forces that pile up in the guardrail system, thus causing the vehicle to overturn or to exit the system at relatively high angles of roll, pitch, or yaw that at the very least may adversely affect the driver's efforts to control the vehicle.

The relative absence of reliable release is not a new problem. It has been a major problem that has plagued the worldwide highway safety industry since its inception over a hundred years ago. Extraneous forces related to inadequate release affect the successful functioning of the entire system at a basic level. Wide variations in release behavior have meant that important guardrail system forces remain largely unmanaged, making optimum and consistent system performance virtually impossible to achieve. Variations include unpredictable and undesirable force combinations and pile-ups when release fails to occur.

While the symptoms of these problems have long been recognized, the problem itself has largely remained undefined and not well understood, even to the point of being somewhat regarded as "stochastic", intractable and possibly unsolvable. Within the United States as well as in Europe, many local variants of standard guardrail systems have cropped up, each representing the best local attempt to improve system capabilities.

Recently, there has been a vigorous effort to raise national performance standards that guardrails must satisfy. Increasingly stringent testing criteria have uncovered serious deficiencies in the capabilities of standard "W-beam" guardrail systems. Accordingly, recent efforts have focused on the development of new guardrail systems to accomplish safety goals more effectively.

In some cases, guardrail systems have actually been proposed for both weak and strong post systems that place the guardrail panel splices at the mid-span of the support posts in an attempt to reduce the variation of release forces at least somewhat by ensuring that the post bolt head must pass through no more than a single ply to accomplish release. In other cases, deeper blocks have been proposed in an effort to address the problems associated with the hard snagging of vehicle wheels on posts. None of these proposed approaches has gained wide acceptance, since they have represented only partial solutions to individual symptoms of the problem of inadequate release. Moreover, these solutions generally have had the effect of significantly increasing system complexity, cost, and installation time, without markedly increasing system capabilities.

SUMMARY OF THE INVENTION

One aspect of the present invention is to provide an improved guardrail system that may be used in median strips and adjacent to roadways that more consistently releases during impact with a vehicle to create a more uniform, stable and predictable response. Another aspect is to provide a cost-effective, retrofitable guardrail system that may be employed interchangeably along with, or in lieu of existing guardrail systems. Yet another aspect is to provide a guardrail system with the strength to meet or surpass highway safety standards. Still another aspect is to provide a guardrail system capable of dissipating the impact energy of vehicle collision more effectively than existing guardrail systems.

A technical advantage of the present invention includes its ability to consistently release the guardrail or other vehicle impact member in a prescribed manner from substantially horizontal or vertical support members. This enhanced release permits the highway engineer to maximize the strength a guardrail system and provides for a more stable and predictable response during vehicle impacts with the system. Accordingly, the guardrail system may withstand significant forces of impact while maintaining adequate safety to passengers, bystanders, and vehicles.

In one embodiment, forces acting largely parallel to the long axis of the guardrail act primarily on one portion, while forces acting perpendicular to the face of the guardrail act primarily on a different portion, where paths are provided for release in a prescribed and repeatable load range.

In a particular embodiment, one or more different positioning members may be disposed longitudinally along the guardrail to assist with the installation or release process.

In another embodiment, the guardrail system includes end terminals and a cable guardrail, and the releasing member accomplishes the release of the cable from posts.

In one embodiment, a guardrail system is provided for installation along a roadway to redirect an errant vehicle, comprising a plurality of spaced support posts, a guardrail mounted on the plurality of support posts by a plurality of securing members, each securing member passing through a respective opening in the guardrail and an opening in a respective support post, a releasing member adjacent the securing member for releasing the guardrail from the support post during a vehicle impact, and a positioning member for centering the securing member within a central portion of one of the openings in the guardrail and the support post.

In another embodiment, a structural safety system to absorb energy from an errant vehicle includes at least one support, at least one vehicle impact absorbing member mounted to the support by a securing member passing through an opening in one of the vehicle impact absorbing member and the support, a releasing member for releasing the vehicle impact absorbing member from the support during a vehicle impact, the releasing member being adjacent the securing member or being an edge of the opening in the one of the vehicle impact absorbing member and the support, and a positioning member for centering the securing member within a central portion of the opening in one of the vehicle impact absorbing member and the support.

Still another embodiment includes a fastening system for mounting a vehicle impact absorbing member to a support, comprising a securing member for securing the vehicle impact absorbing member to the support, the securing member passing through an opening in one of the vehicle impact absorbing member and the support, a releasing member adjacent the securing member for releasing the vehicle impact absorbing member from the support during a vehicle impact, and a positioning member for centering the securing member within a central portion of the one of openings.

In other embodiments, a highway safety structural system positioned along a roadway to attenuate the energy of errant vehicle comprises a plurality of substantially vertical support posts, one or more vehicle impact members mounted on the plurality of support posts by a plurality of securing members, each securing member passing through a respective opening in one of a vehicle impact member and a support post, a releasing member for releasing the vehicle impact member from a support post during a vehicle impact, the releasing member comprising a portion of material adjoining the one of the openings in the vehicle support member and the support post, and a positioning member for centering the securing member within a central portion of the one of the openings in the vehicle impact member and the support post.

In yet another embodiment, a guardrail system for installation along a roadway to redirect an errant vehicle comprises a plurality of spaced support posts, a guardrail mounted on the plurality of support posts by a plurality of securing members, each securing member passing through a respective opening in the guardrail and a support post, a force attenuating member held in position with respect to the support post by the securing member, and the force attenuating member is of a sheet metal construction that crushes to reduce forces on that guardrail during a vehicle impact.

In some embodiments, the force attenuating member consists of a metallic cone or hollowed bar that crushes and deforms plastically to attenuate spikes in forces that may occur between the guardrail and the post, adjacent to securing locations. In another embodiment, the force attenuating member is plastic that is resilient enough to recover its original shape with each repeated use. In yet another embodiment, the releasing member itself absorbs energy and helps to attenuate peak forces.

Other technical advantages are readily apparent to one skilled in the art from the following figures, descriptions, and claims.

BRIEF DESCRIPTION OF THE DRAWINGS

For a more complete understanding of the present invention, and the advantages thereof, reference is now made to the following brief descriptions, taken in conjunction with the accompanying drawings, wherein like reference numerals represent like parts, in which:

FIG. 1 is an isometric view of a guardrail system installed along a roadway, incorporating aspects of the present invention;

FIG. 1A is an isometric view, with portions broken away, illustrating aspects of the present invention at a splice connection between adjacent sections of guardrail beams;

FIG. 1B is a cross-section of a guardrail secured to a portion of a post;

FIG. 1C is a cross-sectional view of the guardrail released from the post.

FIG. 1D is an exploded view of a releasing member, a positioning member, a threaded fastener, and a force attenuating member released from a guardrail;

FIG. 1E is an exploded view of a securing member with a releasing member, a positioning member, a force attenuating member, a washer, and a securing nut;

FIG. 1F is a cross-sectional view of the components shown in FIG. 1D, with the releasing member each shown in dashed lines;

FIG. 1G illustrates another embodiment of a positioning member;

FIG. 1H illustrates an alternate embodiment of a securing member;

FIG. 1K illustrates another configuration for securing the guardrail to a support post;

FIG. 1L illustrates the guardrail released from the support post;

FIG. 1M is a pictorial view of a suitable releasing member;

FIGS. 1N-1R each illustrates an alternative releasing member;

FIG. 2 is an isometric view illustrating a guardrail and the releasing member;

FIG. 2A illustrates the position of the securing member relative to a slot;

FIG. 2B illustrates a position of a securing member relative to a slot according to the prior art;

FIG. 2C illustrates a head of the securing member substantially centered within a slot in a guardrail;

FIG. 2D illustrates a securing member within a slot according to the prior art;

FIG. 2E illustrates the guardrail released from the securing member shown in FIG. 2D;

FIG. 2F illustrates the securing member centered in the slot by a positioning member;

FIG. 2G illustrates the guardrail released from the securing member shown in FIG. 2F;

FIG. 7 is an isometric view, with portions broken away, illustrating another embodiment of a system installed along a roadway using blackouts and support posts;

FIG. 8 is an isometric view, with portions broken away, illustrating an alternate embodiment of a system installed along a roadway using blackouts and support posts;

FIG. 9 is an isometric drawing, with portions broken away, showing a highway guardrail system having an end terminal assembly installed on one end of the highway guardrail system;

DESCRIPTION OF THE PREFERRED EMBODIMENTS

Figure 1J:
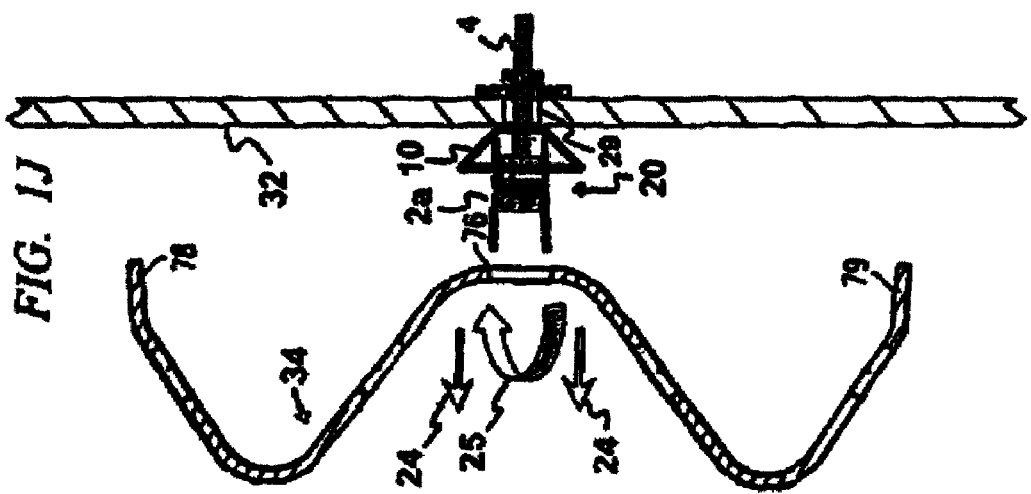
FIG. 1J illustrates the guardrail released from the post.

Preferred embodiments of the present invention and its advantages are best understood by referring now in more detail to the figures in which like numerals refer to like parts.

Referring to FIG. 1, guardrail system 30 is shown installed adjacent to roadway 31. The direction of oncoming traffic along roadway 31 is illustrated by directional arrow 33. Guardrail system 30 includes a plurality of support posts 32 anchored adjacent to roadway 31 by having a lower portion of each post below ground level, with a plurality of guardrail beams 34 attached to support posts 32 and secured by post bolts 37. For illustrative purposes, FIG. 1 includes one complete guardrail beam 34 and two partial sections of adjacent guardrail beams 34 to illustrate the splice connections between adjoining sections.

Guardrail system 30 may be installed along roadway 31 in order to prevent motor vehicles from leaving roadway 31 and to redirect vehicles away from hazardous areas without causing serious injuries to the vehicle's occupants or other motorists. Guardrail systems incorporating aspects of the present invention may be used in median strips or shoulders of highways, roadways, or any path that is likely to encounter vehicular traffic.

Support posts 32 are provided to support and maintain guardrail beams 34 in a substantially horizontal position along roadway 31. Posts 32 are typically anchored below or alongside roadway 31. Posts 32 may be fabricated from wood, metal, or a combination of wood and metal. "Break away" support posts may be provided to facilitate a predetermined reaction to a specified crash event.

The number, size, shape and configuration of support posts 32 may be significantly modified within the teachings of the present invention. For instance, support posts may be formed of a material that will break away upon impact, such as wood. In one embodiment, support posts satisfactory for use with the present invention may be formed from two wood sections. The first wood section may be disposed underneath roadway 31. The second wood section may be disposed above roadway 31, and a connecting member provided for connecting the first wood section with the second wood section. Similarly, support posts 32 may be comprised of two metal sections, the first metal section being an I-beam disposed below roadway 31 and the second metal section being an I-beam disposed above roadway 31, with a member for connecting the I-beam sections together. Alternatively, support posts 32 may comprise a combination of metal, wood, or other materials such as composite materials. Various types of support posts are described below in conjunction with the alternative embodiments of FIGS. 9 and 10.

Referring now to FIGS. 1 and 1A, guardrail beams 34 are secured to support posts 32 through a plurality of post bolt openings, such as slots 39, and corresponding releasable fasteners 37. Adjacent sections of guardrail beam 34 are coupled with one another by a plurality of splice bolts 36 protruding through splice bolt slots 38. The number, size and configuration of bolts 36, releasable fasteners 37, and slots 38 and 39 may be significantly modified within the teachings of the present invention. In the illustrated embodiment, the configuration of slots 38 and 39 and bolts 36 comply with American Association of State Highway Transportation Officials (AASHTO) Designation 180-89. Suitable hardware, including nuts and washers may be provided to secure bolts 36 to releasable fasteners 37. Various other mechanical fastening techniques and components may be employed within the teachings of the present invention.

In the particular embodiment shown, conical spacer member 10, formed from thin sheet metal such as steel or other suitable material, is placed between rear face 41 of guardrail beam 34 and the flange of the I-beam post to which it is mounted at a splice of guardrail system 30. On the other side of the same post flange, round washer 22 and nut 6 serve to tighten releasable fastener 37 of the present invention.

In some instances, such as when blocks are included, securing bolt threaded portion 4 (see FIG. 1H) may have various lengths "d" that accommodate specific installation needs. In these cases, the bolt diameter is varied as needed, the only limiting factor for retrofit cases such as guardrail system 30 being the installation of U-shaped positioning member 8 through post bolt slot 39 that measures a maximum ¾ inch in width along its 2½ inch length. Also shown in FIG. 1H is washer nut 22a that may be used in some embodiments in lieu of a separate washer 22 and nut 6 to secure releasable fastener 37 to a post of the guardrail system. Releasable fastener 37 is shown in FIG. 1E in isometric view, and in FIG. 1F in partial cutaway cross-section, and again in FIG. 1B in partial cutaway cross-section at a post bolt hole 29 of a post 32, corresponding to the splice location shown in FIG. 1A. For many applications, a preferred releasing member is a round washer of substantially uniform thickness. Other variations, including using no washer next to the securing nut may be used in other embodiments.

While it is convenient to have members 20 (see FIG. 1E) mounted together prior to installation with guardrail system 30, it is not necessary, other than for manufacturing uniformity and installer convenience purposes. Thus, other embodiments of the present invention might have some of all of these members mounted together prior to installation, in various combinations for various purposes. Each of the members, including the releasing member 2, the threaded portion of the securing member 4, or the force attenuating member 10 may be combined in parallel or in series in various ways, or arranged geometrically, to achieve specific capabilities.

Each of the various members may serve multiple functions in order to maximize performance efficiencies. One example is the cone-shaped member 10 mounted coaxially with a bolt, that simultaneously serves not only as a force-attenuating and energy-absorbing member, but also interlocks with a positioning member 8 or members to provide a "hard stop" against over-tightening the bolt during installation, which might otherwise result in damage to a release member. By defining gap 11 that corresponds roughly to the thickness of the guardrail (see FIG. 1F), as the hard stop is reached during installation, the tightening forces acting on releasing member 2 may be minimized, thereby preventing premature release during installation in response to high tightening forces. In this same embodiment, the same cone-shaped member 10 also serves to lock the positioning member 8 into place, not only so that it may not be affected by extraneous forces during service prior to a crash event, but also to maintain the positioning member within a precise range of installed location, such as near the center of a post bolt slot in a W-Beam guardrail beam installation. It is important to note that because the narrow end of the cone, which contacts the post, will tend to crush first, due to a higher concentration of forces at the narrow end, the benefits that it provides to the positioning member at the wider end of the cone may be substantially maintained at least during a portion of time during activation of release. In addition, having the narrow end of the cone in contact with the guardrail mounting post permits some pivoting of the entire assembly during a crash event to further align forces in a favorable manner for consistent and stable release of the guardrail from the post. Finally, having the narrow end of the cone contacting the post, provides a versatile interface for retrofit installations where the flange of the post includes a standard ¹³⁄₁₆ inch diameter post bolt hole in the flange of the post.

In still another embodiment of the present invention, each of these members could be integrated as a single unit, and possibly even machined or forged into shape as a single continuous part. An example of this is shown in FIG. 1G where U-shaped positioning member 8 with mounting hole 14 has been integrated into one solid piece, thus eliminating the need for nut 5, and lock washer 5. The resulting combined member 8a with mounting hole 14a is also shown may be integrated with bolt threaded portion 4 using welding or other fabricating techniques to assemble the parts together into a unit. In other applications, combined member 8a could be installed as a separate member.

Securing capability of the releasable fastener may be comprised of a threaded fastener, such as a bolt, or other securing member, with the purpose of enabling installation to occur in a simple, cost effective operation, without damaging or altering other members of the releasable fastening capability, such as releasing member 2, until such time as the release occurs. The securing member should generally have sufficient strength not to fail before the releasing member has released.

Guardrail beam 34 comprises front face 40, and a rear face 41, disposed between top edge 42 and bottom edge 44. Front face 40 is preferably disposed adjacent to roadway 31. First crown 46 and second crown 48 are formed between top edge 42 and bottom edge 44. Each crown 46 and 48 may also include a plurality of fluted beads 50, which will be described later in more detail. In a "Thrie-Beam" configuration (see FIGS. 8 and 10), guardrail beam 834 includes a third crown. Top edge 42 and bottom edge 44 terminate at folds 52 and 54, respectively. For the embodiment illustrated in FIG. 2, folds 52 and 54 turn inwardly toward front face 40 of guardrail beam 34, facing one another.

Upstream end 70 of each section of guardrail beam 34 is generally defined as the portion beginning at leading edge 64 and extending approximately thirteen (13) inches along guardrail beam 34 toward trailing edge 66. Similarly, downstream end 72 of each section is generally defined as the portion of guardrail beam 34 beginning at trailing edge 66 and extending approximately thirteen (13) inches toward the associated leading edge 64. Intermediate portion 74 of each section of guardrail beam 34 extends between respective upstream end 70 and downstream end 72.

Folds 52 and 54 comprise tubular curls 90 and 92 which may extend the entire longitudinal length of top edge 42 and bottom edge 44, respectively, with the exception of downstream end 72. At downstream end 72, top edge 42 and bottom edge 44 terminate at folds 52 and 54 which comprise hemmed portions 56 and 58 respectively. In some instances, the fold may be partially removed or trimmed in order to accommodate various manufacturing operations, or to facilitate guardrail installation.

Referring again to FIG. 1A, a splice connection between adjacent guardrail beams 34 is illustrated. Upstream end 70 and downstream end 72 of adjacent guardrail beams 34 are configured to allow tubular curls 90 and 92 to interlock with hemmed portions 56 and 58. Guardrail beams 34 are typically fabricated from a flexible sheet metal type material.

Looking at a guardrail beam 34, splice bolt slots 38 and post bolt slots 39 are elongate, and much larger than the diameter of bolts 36 and releasable fasteners 37, respectively, which extend therethrough. Slots 38 and 39 allow bolts 36 and releasable fasteners 37 additional movement axially, and therefore sustain a significant fraction of the applied force.

The configuration of FIG. 1A illustrates the interconnection between adjacent sections of guardrail beam 34. Accordingly, guardrail beams 34 may be of various Federal Highway Administration accepted constructions that are incorporated into existing guardrail systems as needed, and an entire retrofit of any particular guardrail system installation is not required in order to recognize the benefits of the present invention.

Guardrail beams 34 are preferably formed from sheets of a base material such as steel alloys suitable for use as highway guardrail. In one embodiment, guardrail beam 34 may also be designed and fabricated according to AASHTO Designation M180-89. Although the embodiment illustrated in FIGS. 1 and 1A, is installed with guardrail having a generally "W-Beam" shape, other shapes, including but not limited to a "Thrie-Beam," may be suitable for many applications. Various combinations of guardrail, posts and blocks, are accordingly shown in FIGS. 1, 7, 8, and 9. FIG. 7 shows a "W-Beam" shape guardrail installed on steel blocks made from sections of steel W6×8.5 I-beam blocks, mounted on steel W6×8.5 I-beam posts. FIG. 8 shows a "Thrie-Beam" guardrail shape installed on wood blocks, mounted on steel W6×8.5 I-beam posts. Finally, FIG. 9 shows a "W-Beam" guardrail shape installed on wood blocks, mounted on 6×8 inch wood posts.

Guardrail beam 34 is installed in accordance with teachings of the present invention to demonstrate improved safety performance. Recently, increased interest in the need for more stringent safety requirements has culminated in discussions about the next generation of testing requirements following the National Cooperative Highway Research Program Report 350 (NCHRP Report 350) guidelines. The performance standards of NCHRP Report 350 itself require all new safety hardware to be tested with larger vehicles than required by previous standards. NCHRP 350 evaluates all safety hardware within three areas: structural adequacy, occupant risk, and vehicle trajectory. Each area has corresponding evaluation criteria. The Federal Highway Administration (FHWA) officially adopted these new performance standards and has ruled that all safety hardware installed after August of 1998 will be required to meet the new standards.

One configuration of a releasable fastener 37 is shown installed in FIGS. 1 and 1A. It should be evident form the details further provided in subsequent Figures that various practical embodiments of the present invention are compatible for installation with a wide variety of guardrail installations on a retrofitable basis. Retrofitability is important in achieving improvements to existing highway guardrail and end terminal systems.

Some embodiments may be summarized as principally including various combinations of securing members, positioning members, and a releasing members. In the preferred embodiment shown in FIGS. 1 and 1A, releasable fastener 37 includes round washer 2 mounted to a 5/16 inch diameter bolt having threaded portion 4 having bolt head 3, with release member 2 mounted on the bolt by U-shaped positioning member 8 and held in place by tightening nut 6 onto lock washer 5 that in turn holds U-shaped positioning member 8 and release member 2 in position as a unit 20 (see also FIG. 1E) that is installed through post bolt slot 39 in the face 40 of guardrail beam 34. The deformed shape 2a of release member 2 is shown in isometric view in FIG. 1D, along with deformed cone shaped spacer 10a, as well as in section view in FIG. 1F, which also shows in greater detail the interlocking of cone shaped spacer member 10 with U-shaped positioning member 8 to define gap 11.

Figure 1I:
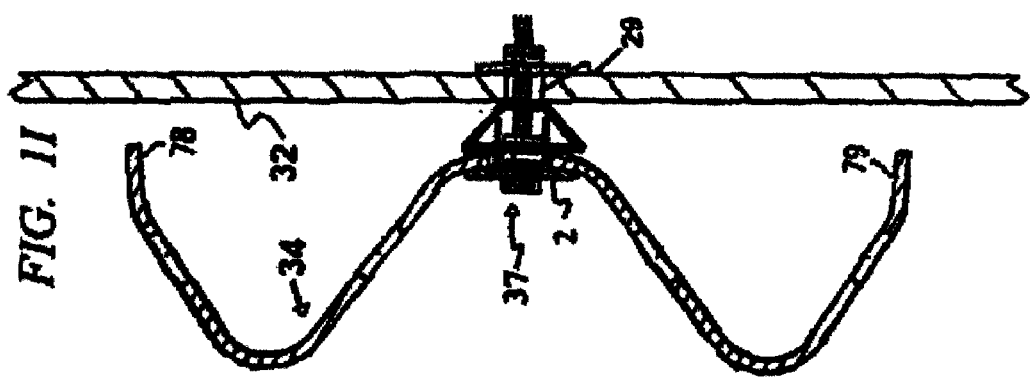
FIG. 1I is a cross-sectional view of a guardrail secured to a portion of a post.

Turning now specifically to the cross section views with portions cut away, provided by FIGS. 1B and 1C, 1I and 1J, 1K and 1L, representing mounting and release of guardrail beams 34 at posts 32. In these figures activation forces 24 and activation twisting moments 25 act on the releasing member to accomplish release of the guardrail from the post by activating releasing member 2 to deform to a general U-shape represented by 2a. Each of these sets of figures illustrate aspects of the operation of releasable fastener 37. FIGS. 1B and 1C correspond to the splice shown in FIG. 1A. FIG. 1B shows a cross section view of the installed guardrail panels that are mated together at a splice and secured to post 32 using the releasable fastener 37 of the present invention. During a crash event, activation forces 24 and activation twisting moments 25 deform release member 2 to the shape shown as 2a in FIG. 1C. In a similar fashion, FIGS. 1I and 1J show the same sequence for a conventional "W-Beam" guardrail beam having blade edges 78 and 79, corresponding to a non-splice mounting at a post. FIGS. 1K and 1L show the same sequence for a conventional "W-Beam" guardrail beam having blade edges 78 and 79, corresponding to a non-splice mounting at a post, except that in this case releasable fastener 37 has been installed in the opposite orientation—with releasing member 2 in contact with the back side of the flange of post 32 with an appropriate diameter hole 29. Note that in this case a mounting slot would function adequately instead of hole 29.

It should be readily apparent to those familiar with the art that a releasing member of the present invention, including member 2, may take alternate shapes and features as represented in perspective view in FIG. 1M, FIG. 1N, FIG. 1O, FIG. 1P, FIG. 1Q, FIG. 1R. Each of these figures highlights alternate variations of the shape and features of releasing member 2 that are possible within the teachings of the present invention. In FIG. 1M a round washer 202 has been bent along lines 237 to form two flanges 235 that themselves will deform as washer 202 is mounted on a bolt through hole 214 and tightened into place on subassembly 20 (see FIG. 2E) such that the flanges 235 deform in contact with positioning member 8 as nut 6 is tightened in assembly 20 (deformation and assembly of 202 not explicitly shown) in order to provide a desired release load. In FIG. 1N a round washer 302 has been drilled to provide holes 348 that generally weaken round washer 302 and may also alter the deformed shape of 302 during release. Holes 348 may be sized to provide a desired release load. In FIG. 1O a round washer 402 has been bent along lines 437 to form two flanges 435. Since flanges 435 are facing in the opposite direction from those of round washer 202, they will be facing away from spacer member 8 in subassembly 20. Flanges 435 will thus face outward from front face 40 of guardrail beam 34 when subassembly 20 is installed as shown in FIG. 1A. The presence of flanges 435 greatly increases the release load of release member 435 by increasing the section modulus of washer 402. The size of flanges 435 may be varied to achieve a desired release load for a particular guardrail application. In FIG. 1P a round washer 502 has been provided with edge notches 552 that generally weaken round washer 502 and may also alter the deformed shape and provide cracking of round washer 502 during release. Edge notches 552 may be sized to provide a desired release load. In FIG. 1Q round washer 502 has cracked during release, to form cracked edge notches 552a of cracked washer 502a that has been reassembled onto member 20 in FIG. 1Q, for comparison with uncracked washer 552. In FIG. 1R a rectangular washer 702 has been provided with edge notches 752 that generally weaken rectangular washer 702 and may also alter the deformed shape and provide cracking of rectangular washer 702 during release. Edge notches 752 may be sized to provide a desired release load. The various features illustrated in these figures may be combined to provide additional means to tailor the performance and installation related functions of various embodiments, either separately, or in combination, by selectively weakening the member or by defining lines along which the member will bend, tear, or fold during release. The shapes of releasing members of various embodiments may include round, oval, rectangular, or even irregular shapes, to accomplish specific tasks, when oriented in prescribed ways during installation. Still other shapes or combinations for particular applications should be readily apparent to those skilled in the art, and only representative embodiments have been represented in these Figures.

Various technical benefits are attained by employing a guardrail system with a defined or regulated release. The term "regulated" is defined to mean controlled within a relatively narrow range, such as to be useful for repeatable crash testing purposes. The term "transformable" is defined to include changes in form, shape, consistency, or material characteristics, or the strength or continuity of the structure. These changes include physical effects, such as elastic or plastic deformation, cracking, shearing, cutting, dislodging, bending, distorting, sliding, rotating, or twisting of one or more portions to accomplish the release. It also includes the placement of materials or shapes in parallel or series arrangements to achieve combined interactions that result either directly or indirectly in release, such as through a triggering or toggling device, mechanism, or arrangement. All of these variations individually or in combination are consistent with this invention, and result in a predictable release along a defined path or repeatable positioning is involved in accomplishing the release.

FIGS. 3A, 3B, 3C, 3D, 3E, and 3F show additional details in cross section of alternate shapes of releasing members. The preferred embodiment of FIG. 1F is shown again in FIG. 3A, without deformed member 2a, but including washer nut 22a, for a side-by-side comparison with other alternate embodiments in order to show some aspects of how various members may be combined in various ways to accomplish the securing, positioning, and releasing functions of the present invention, along with other benefits, consistent with the present teachings.

Figure 3A:
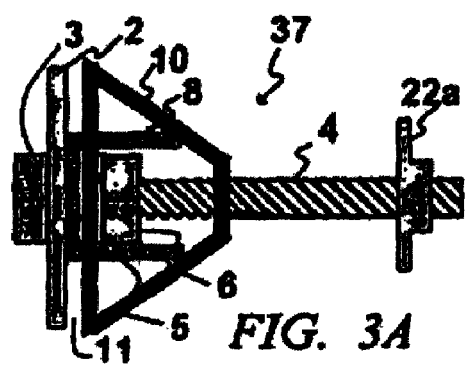
FIG. 3A is a side view illustrating another embodiment of a releasing member, positioning member, a thread securing member, and a force attenuating member.
Figure 3B:
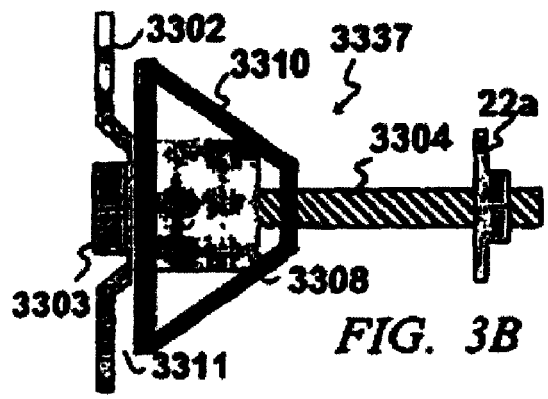
FIG. 3B-FIG. 3F each illustrates an alternative embodiment of a securing member.
Figure 3C:
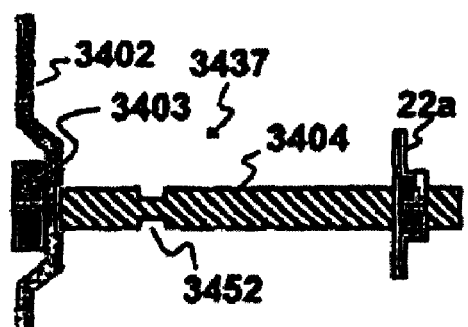

FIG. 3B illustrates the integration of members 5, 6, and 8 into a single member 3308 of releasable fastener 3337, while release member 2 has been modified to the winged shape shown as 3302 in order to optimize gap 3311 for various applications. Note that gap 3311 is defined by the interlocking of cone spacer member 3310 with member 3308 as shown in FIG. 3B, but that positioning in a slot is provided by member 3302 itself, rather than by member 3308. FIG. 3C shows a similar releasable fastener as FIG. 3B, except that no cone shaped spacer member is provided, and no member such as member 3308 is provided to interlock with it in order to define a gap such as 3311. Instead, FIG. 3C shows releasable fastener 3437 where the portion of release member 3402 near bolt head 3403 will interface with the flange of post 32 to provide a hard stop capability during installation, as washer nut 22a is tightened. A notch in threaded portion 3404 is provided in order to further define release forces. However, it may be noted that notches may only be desired in very special cases, simply because a bolt may easily fail in tension or torsion at a notch during installation of releasable fastener 3437.

Figure 3D:
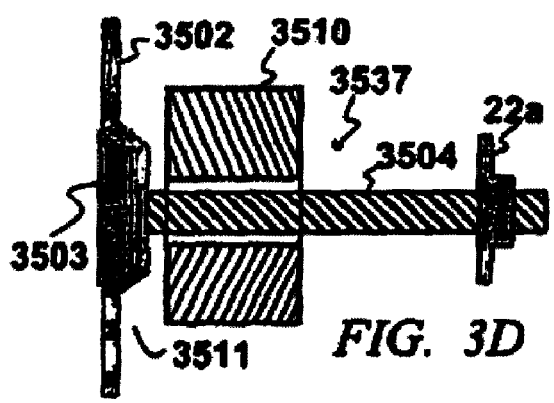

FIG. 3D shows a cross section of another alternate embodiment 3537 that includes a cylindrical shaped spacer member 3510, but not a positioning member. In this case, as in the case of releasable fastener 3437 of FIG. 3C, the portion of release member 3502 near bolt head 3503 will provide an interface with the flange of post 32 to provide a hard stop capability during installation.

Figure 3E:
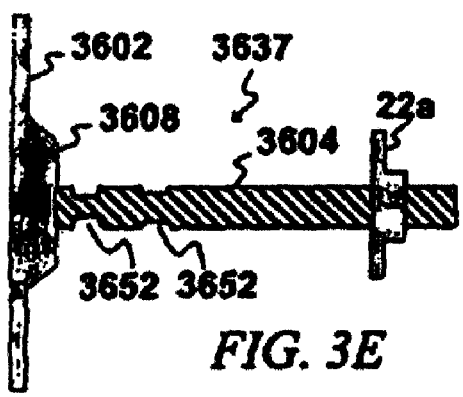

FIG. 3E shows a cross section of releasable fastener 3637 that is similar to releasable fastener 3437 of FIG. 3C except that the positioning member 3608 is more defined. However, it remains integral with release member 3602. Note that positioning member 3608 serves as the bolt head. In addition, two notches along threaded portion 3604 are provided, versus the single notch of releasable fastener 3437.

Figure 3F:
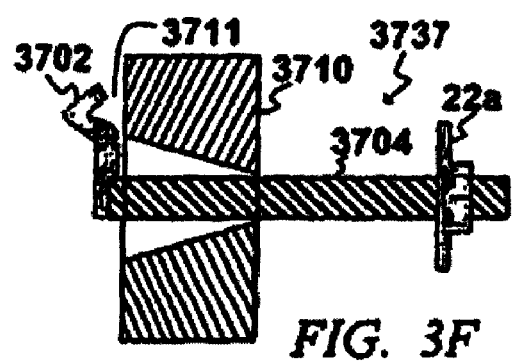

FIG. 3F shows in cross section various features of releasable fastener 3737 that includes a spacer member 3710 that provides a hard stop against a portion of release member 3702 near to threaded portion 3704, the advantage of which is to minimize the moment arm through which forces act between releasing member 3702 and spacer member 3710, so that release member 3702 resists release during installation. This is also helped by the presence of gap 3711 that accommodates the thickness of the guardrail without undue forces on the extreme outer portion (away from 3704). Finally, releasable fastener 3737 serves to illustrate that it is not necessary for release member 3702 to be symmetric, in order to function adequately.

Turning now to the isometric views of FIG. 6A, FIG. 6B, FIG. 6C, and FIG. 206D, other embodiments shown in isometric views are presented and discussed within the present teachings. Note that in the embodiments of FIGS. 6A, 6B, and 6C washer nut 22a is not explicitly shown, while in FIG. 6D no nut is used at all.

Figure 6A:
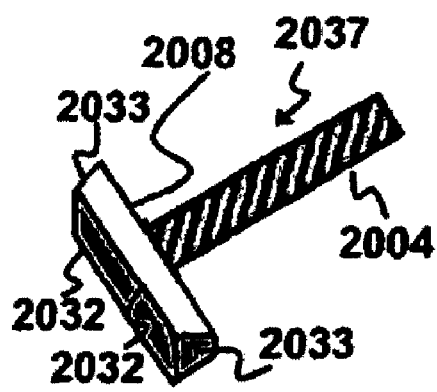
FIG. 6A-6D each illustrates an alternate embodiment of a securing member and a positioning member.

In FIG. 6A, releasable fastener 2037 is shown in having a wedge-shaped positioning member 2008 that is ⅛ inch wider at its extreme end near edges 2032, than the ¾ inch wide slot 39 that it is made to be installed into, and may include a slight lip along either the top, the bottom, or both edges 2032 of the wedge, to provide a limit against the slot deforming during minor impacts or during nuisance damage that may occur prior to a vehicle crash during service.

The extreme lateral ends 2033 of wedge portion 2008 provide a positioning member capability against the wedge moving laterally outside of a desired range during service. In addition, extreme lateral ends of the wedge 2033 may be tapered more than the middle section, so that there is minimal snagging of the extreme lateral ends 2033 near the ends of slot 39 during release. The total depth of the wedge in direction of the taper, near the axis of the bolt, serves to define a tightening limit during installation, so that release is not activated during installation. As may be evident in the above discussion, releasable fastener 2037 incorporates several aspects of the teachings of the present invention, including isolating the releasing means from significantly snagging on the ends of slot 39, providing a stop against over-tightening, as well as narrowing the range of release loads by controlling the amount and location of the deformation of slot 39 during release—a consideration that will be elaborated on in detail below. The "hard stop" feature enables the installer to install the releasing member, and to apply significant force in doing so, without affecting the operational capability of the releasing member, thereby increasing the overall reliability and uniformity of an installed system.

In another embodiment, a clip or a tab is formed into a post (not explicitly shown), along with, or in lieu of a bolt and nut arrangement to secure members together. In one particular embodiment, a tab protrudes from a the flange of the post (not explicitly shown), and has a shape that passes through the post bolt slot of a standard W-beam guardrail panel, wherein the tab shape itself serves simultaneously to secure the guardrail, and as the positioning member that helps to provide consistent loading of another portion of the same tab that serves as the release member. Another particular embodiment includes other tabs or various types of protrusions that are formed into the flange of the post adjacent to the positioning tab, to serve as energy absorbing or force attenuating, or support members for the positioning portion, or as various combinations of these functions in order to obtain substantial improvements over installation or release methods of the prior art.

Figure 6B:
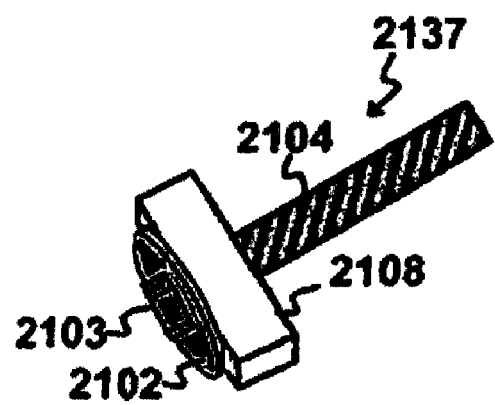

In FIG. 6B, releasable fastener 2137 is shown having wedge shaped positioning member 2108 that is configured so that the wedge is of an almost uniform width along the direction of the central axis of the bolt, with a separate release member 2102.

Figure 6C:
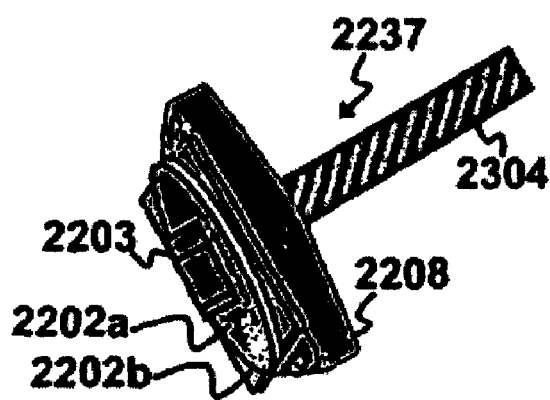

In FIG. 6C releasable fastener 2237 includes wedge shaped positioning member 2208 that is also largely uniform in width along the direction of the long central axis of the bolt. It includes two releasable elements 2202a and 2202b in series arrangement.

Figure 6D:
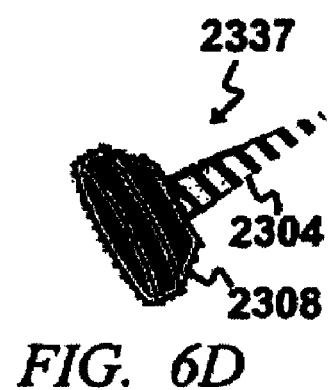

Finally, FIG. 6D shows releasable fastener 2337 that is shaped like a rounded elongated tapered version of the wedge-shaped positioning member 2037 of FIG. 6A, and functions in a similar fashion, except that member 2308 is tightened into position by putting the tapered threaded portion 2304 through the post bolt slot 39 in the guardrail, through a hole in the flange of the support post, followed by tightening of a screwed-on member from the other side of the post flange, made of solid plastic or sheet metal for that purpose.

Referring now to FIG. 2 which is an isometric view of an installed releasable fastener 37 with portions removed, and to FIGS. 2A and 2B, that illustrate a front view of a post slot in guardrail panel 34 with portions removed, the following discussion focuses upon the important role that positioning capability plays in the reliable release of guardrail panels from posts.

FIG. 2 shows the preferred embodiment of releasable fastener 37 in its installed position in a slot 39 of a guardrail panel 34. Of particular note is the fact that the U-shaped washer of positioning member 8 maintains releasing member 2 in an optimal position near the center portion of slot 39 where it cannot interact significantly with the ends of the slot 39d during release. Substantial interaction with the slot end 30d may be defined in terms of significant changing of the release forces or the manner of release of the release member from those associated with positions more near to the center of the slot. Even though releasable fastener 39 may be installed near the exact center of slot 39 as shown in the isometric view of FIG. 2C, it may move during a vehicle impact to the guardrail system to one extreme of slot 39, as shown in FIG. 2. and FIG. 2A.

This is in stark contrast to the typical behavior of a buttonhead bolt 1021 of the prior art as illustrated in FIG. 2B which is a front view of the outline of a guardrail buttonhead post bolt 1021 in slot 39 of a guardrail beam with cutaway portions, where the head of the bolt, which is quite strong as compared with the sheet metal of the guardrail beam 34, is snagged adjacent one end of the post bolt slot due to the overlapping of the margin 1025 between the apex of oval shoulder 1010 of the bolt, and the edge of the bolt head.

Figure 4A:
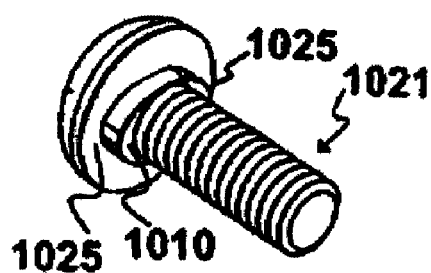
FIG. 4A illustrates a securing bolt according to the prior art.
Figure 4B:
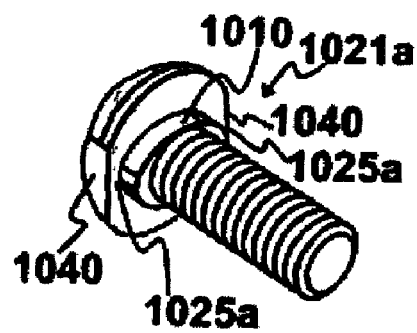
FIG. 4B illustrates another embodiment of a securing member according to the prior art.

Two observations are very worthwhile to note at this point. The first is that the oval shoulder 1010 of buttonhead bolts 1021 or 1021a as shown in the isometric views of FIGS. 4A and 4B is not present to serve as a positioning means, but only to serve as a means of preventing the bolt from turning in the slot while it is being tightened from the other end—thus requiring only a single wrench, which simplifies installation. As is illustrated in the isometric view of FIG. 2D with portions cut away, the oval shoulder of installed bolt 1021a (or its alternate 1021) usually ends up turned at an angle with respect to the long central axis of slot 39 that further negates any ability to appreciably limit the interaction of margin 1025a (or 1025) with the end portion 39d of slot 39.

The second observation is that the positioning of the bolt head adjacent one end of the post bolt slot may either occur during normal installation of the guardrail system, or may occur as guardrail beams are pulled axially during vehicle impact, even though the bolt may have been originally installed near to the center of slot 39 having longitudinal edge 39a. In either case, many installation-specific and impact-specific variables may combine in any number of ways to determine the extent of snagging of the bolt head of button head bolt 1021, or its alternate, 1021a on the end 39d of post bolt slot 39. The result is that fundamental aspects of a vehicle crash response of present state of the art systems are sometimes labeled by experienced crash test engineers and academicians as random, erratic, stochastic, and generally unpredictable in terms of their contribution to vital safety performance aspects of current strong post guardrail systems.

This unfortunate interaction of the head of post bolt 1021 or 1021a with an end of a post bolt slot 39, routinely occurs daily along highways in the United States where strong post guardrail systems are installed on steel posts of a standard Modified G4 (1S) Strong Post Guardrail Systems. Various types of securing members may be used, although a threaded rod securing member, with or without a head, may be used. In some cases, the very safety of vehicle passengers of impacting vehicles may be somewhat diminished by this interaction during vehicle impacts with the guardrail system, consistent with the documented experience of crash test engineers.

FIG. 2E is an isometric view illustrating slot 39 that has deformed to the deformed shape 62b of deformed slot 39b, of guardrail panel 34 that deformed to 34b after buttonhead post bolt 1021 or 1021a of the prior art pulled through the slot. Of particular note is the fact that the bolt is supported around a considerable portion of its circumference as it is pulled through the edge of the slot, thus considerably raising the release load, as compared to when it is able to pull through the center of the slot, which sometimes occurs at some posts.

FIGS. 2F and 2G are isometric views with portions cut away, showing a buttonhead bolt, in contrast with the behavior of prior art buttonhead bolts 1021 and 1021a. FIG. 2F shows embodiment 1437 having positioning member 1408 that keeps the head of the bolt from interacting with the end 39d of slot 39 due to the margin 1426 between the edge of the bolt head and the apex or extreme end of spacer member 1408, as it pulls through during release of guardrail panel 34 from a post having a block between the guardrail panel and the post. During the release, slot 39 deforms to deformed shape 62c of deformed slot 39c on guardrail panel 34c that started as (undeformed) guardrail panel 34. In this case, the release loads are lower because of the more limited overlap between the bolt head and portions of the slot, and because the guardrail material adjacent to the straight edges 39a of the slot is much easier to deform than at either end of the slot where the material is constrained by adjacent material.

One principal reason why a better system has not yet been implemented is that a more satisfactory (meaning consistent and reliable) releasable fastener for releasably securing guardrail to posts during vehicle impacts, has not been available. This lack of availability has been largely due to a lack of detailed understanding of how to successfully manage the various forces of guardrail systems, including forces related to the vehicle, including suspension and wheel components that may directly contact the guardrail system 30.

Moreover, it may be stated that not only have the system forces not been very well understood, but they have in actuality been somewhat misunderstood in the prior art, which is how the present strong post systems having blocks between the post and the guardrail came into being in their present form.

Only after considering various aspects of the embodiment of FIG. 1, as well as alternate embodiments, may those skilled in the art understand the wide range of possible embodiments, based in part upon local manufacturing, tooling, and design needs.

It may now be possible to eliminate the use of blocks all together in many strong post guardrail systems, and instead mount W-Beam guardrail directly on strong steel posts, using releasable fasteners 37 of the present invention. This was confirmed in an actual full scale NCHRP Report 350 Test 3-11 crash test involving a 2000 kg pickup truck impacting a Modified G4 (1S) Strong Post Guardrail System, using O-Posts (not expressly shown) as the steel posts, and including preferred embodiments for mounting the W-beam guardrail directly on the strong posts. The results of the crash test were very encouraging, with the crash test behavior of the vehicle being considered to be unusually positive for such an extreme test, as compared with similar tests where blocks such as wood blocks 232 are used at each post between the guardrail and the post.

Figure 5A:
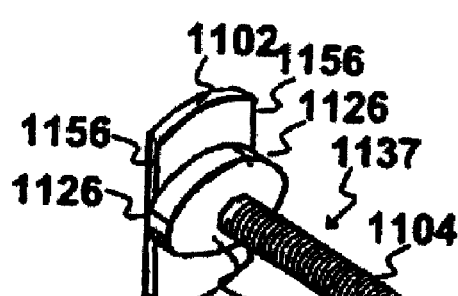
FIG. 5A illustrates a releasing member and a securing member.
Figure 5B:
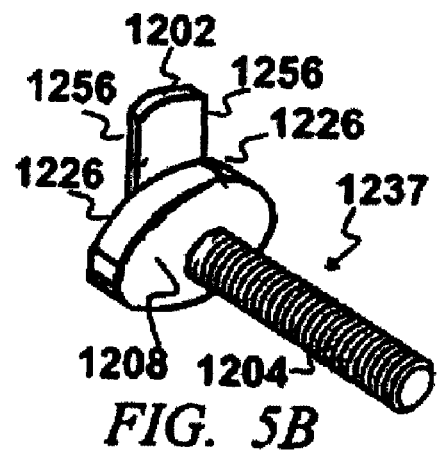
FIG. 5B illustrates another embodiment of a securing member, a positioning member, and a releasing member.

Consider now in more detail some differences between the buttonhead bolts of the prior art shown in FIGS. 4A, 4B, and embodiments of the releasable fastener disclosed herein by looking at the isometric views with portions cut away, of FIGS. 5A, 5B, 5C.

FIGS. 4A and 4B, correspond to buttonhead bolts of ASSHTO Designation: M 180-89. FIG. 4A shows an alternate conventional buttonhead bolt 1021, while FIG. 4B shows another alternate 1021a, where the principal difference is the removal of a 3/32 inch wide margin of material from the edge of the buttonhead at 1040 on opposite sides of the long dimension of the oval shaped shoulder portion 1010. This is certainly not enough to significantly reduce the margin of overlap of the solid buttonhead near 1010 to help in any regard with respect to adequately preventing or altering in a meaningful way the potential for snagging of the strong head of the bolt on the end of guardrail post bolt slot 39. This is particularly true, considering the rotation of the oval shoulder in slot 39 that typically occurs when the bolt is tightened during installation, due to the fact that the longest dimension of the oval shoulder, at 15/16 inch, is only 3/16 inch wider than the 3/4 inch width of the slot 39. Thus, the typical installed position of oval shoulder 1010 is not aligned with its long axis oriented with the long axis of slot 39. Oval shoulder 1010 is more typically oriented at an angle with respect to the long axis of the slot. This is because of the bolt tightening that occurs during installation, since the purpose of oval shoulder 1010 is simply to provide a stop against rotation of the bolt while the nut is being tightened, thus permitting only a single wrench to be used, instead of two. The net effect of rotating bolt 1021 or 1021a during installation, as oval shoulder 1010 provides a stop against rotation of the bolt in the slot, is to further increase the portion of margins 1025 and 1025a that may overlap and interact with the end regions 39d of slot 39, during service.

Therefore, while these prior art bolts do feature an oval shoulder 1010 of slightly increased long diameter relative to the threaded portion, this is not present as a positioning member in guardrail slot 39 (which it is far from being long enough or wide enough to significantly accomplish), but simply to provide a mechanism whereby the nut of the bolt may be tightened, without need for placing a second wrench at the head of the bolt. It may be noted that this is also the case when button head bolts 1021 and 1021a are used as splice bolts in splice bolt slots 38.

Significant improvements over buttonhead bolt designs of the prior art permit new designs to function adequately as releasable fasteners of the present invention. Examples of this are shown as releasable fasteners 1137 and 1237, shown in perspective view in FIG. 5A and FIG. 5B, respectively, where margins 1126 and 1226 are actually inverted as compared with margins 1025 or 1025a of the prior art of FIGS. 4A and 4B, since the apex of each of the positioning members 1108 and 1208 actually protrudes beyond the edge of releasing members 1102 and 1202 in each case, acting positionally to isolate releasing members 1102 and 1202 from significant interaction with the ends 39d of slot 39 during release, thereby significantly narrowing down releasing load ranges.

It is important to note that it is not simply providing an "inverted margin" that defines the difference between the prior art and the present invention, but the combination of an appropriate margin (positive or negative) with the actual geometry of the releasing member to achieve the uniquely selected goal of considerably narrowing the range of the release load by substantially reducing interaction of the releasing member with the end region 39d of slot 39. Thus, it might be possible to technically not have an inverted margin because of how the margin is measured, and yet compensate for that by having an appropriately shaped releasing member that minimizes interaction with the slot end region 39d. The present teachings focus on defining the correct result.

For further insights regarding particular applications, consider various guardrail beams where components disclosed herein may be applied. In one particular FHWA accepted guardrail type called "O-Rail", folds 52 and 54 have the general configuration of tubular curls 90 and 92. Tubular curls 90 and 92 have a generally circular cross section, and may include a plurality of fluted beads 50 associated with each of first crown 46 and second crown 48. Conventional guardrail beams do not contain folds 52 and 54 and typically terminate with "blade edges" at the top and bottom of the cross section. In another embodiment, guardrail beam 34 may be bent around a corner, or an obstacle. This configuration maintains many of the benefits described herein. Splice bolt hole 38 is formed within an upper face 47 of guardrail beam 34.

A vehicle traveling along the right side of roadway 31 will approach from upstream end 70 or leading edge 64 and subsequently depart from downstream end 72 or trailing edge 66 of guardrail beam 34. Each section of guardrail beam 34 is preferably joined with additional sections of guardrail beam 34 such that they are lapped in the direction of oncoming traffic to prevent edges which may "snag" a vehicle or object as it travels along front face 40 of guardrail beam 34. Accordingly, a section of guardrail beam installed at leading edge 64 would be installed upon front face 40 of guardrail beam 34, typically forming an overlap of approximately thirteen inches. An additional guardrail beam installed at trailing edge 66 may be installed upon the rear face 41 of guardrail beam 34, forming an overlap of approximately thirteen inches.

Upon a vehicle's impact with a guardrail, a dynamic response is obtained from the guardrail. The response may include vibration of the guardrail in a direction parallel to the ground and perpendicular to the direction of the vehicle. Conventional guardrail beam sections may respond somewhat effectively when the waves are in a direction away from the vehicle.

Guardrail beam 34 may be manufactured employing conventional "roll form" methods. The total length of a typical section of guardrail beam 34 measured from leading edge 64 to trailing edge 66 as illustrated in FIG. 1, is approximately twenty-five (25) feet. Other lengths of guardrail section including, but not limited to one-half lengths, or twelve and one-half foot members, may also be provided.

Many of the alternative releasable fastener embodiments discussed and illustrated throughout this application may be utilized interchangeably while still producing somewhat acceptable results. Furthermore, some of the individual components may be utilized interchangeably. It will be recognized by those skilled in the art, that a single guardrail beam may employ one particular mounting member at one post, and yet another different mounting member at another post. As utilized throughout this application, the term "mounting" refers member(s) for attaching the guardrail to the post.

As illustrated, the outer perimeters of the release washer need not form a semicircular or circular configuration. Many geometric configurations are available to obtain the benefits associated with the positioning and release capability discussed and illustrated throughout this application.

Each releasing member discussed herein may be reversed to face outward, or toward the rear face of a given guardrail beam, or inward, toward the front face of the guardrail beam. That is, a slot or hole in the flange of the post may serve as the mounting slot, instead of slot 39 or another slot of a guardrail beam.

Referring to FIG. 9, guardrail system 130 is shown installed adjacent to roadway 31. Guardrail system 130 includes many of the same features and components as previously described guardrail system 30. For the embodiment as shown in FIG. 9, guardrail system 130 includes a plurality of blackouts 132 which are disposed between respective support posts 32 and back face 41 of guardrail beam 34.

Figure 10:
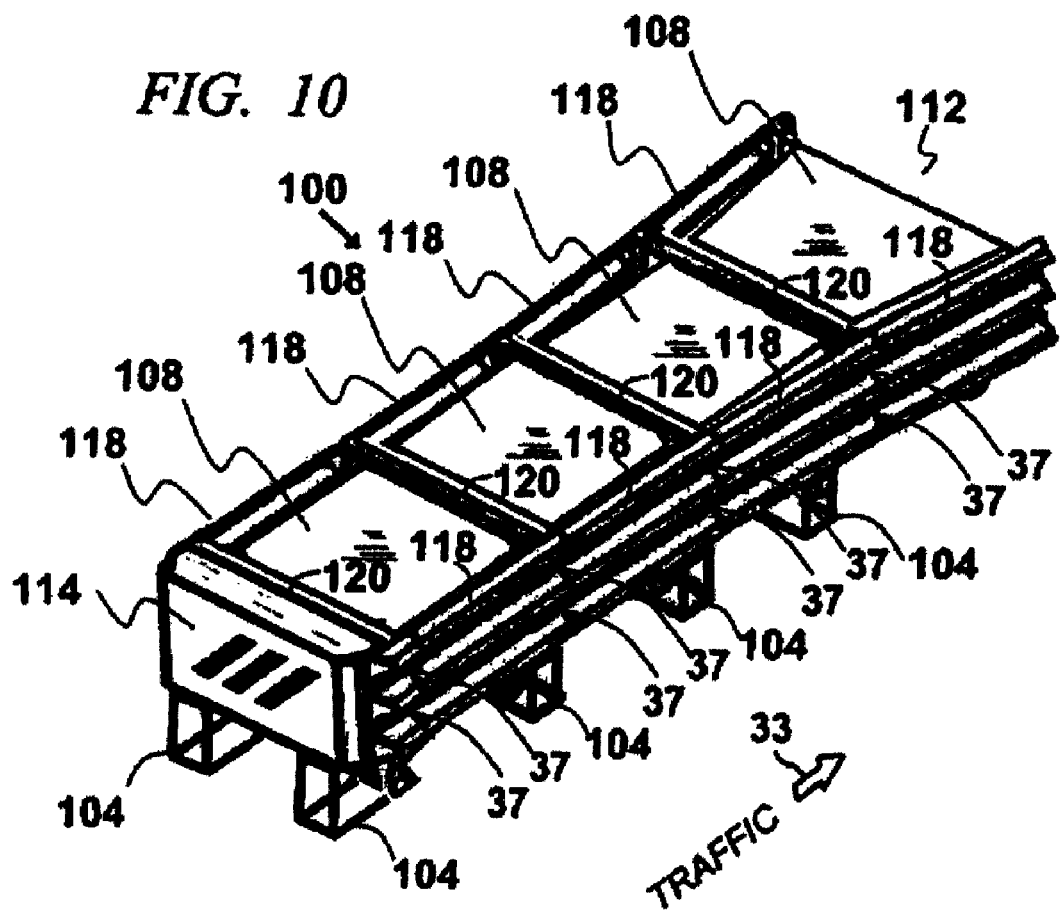
FIG. 10 is an isometric view illustrating a crash cushion installed along a roadway with support frames between spaced guardrails.

Guardrail system 230 incorporating a further embodiment is shown in FIG. 8 installed adjacent to roadway 31. Guardrail system 230 includes a plurality of support posts 32 anchored adjacent to roadway 31 with guardrail beam 834 attached to posts 32 by a plurality of releasable fastening capability of the present inventions 37. Guardrail system 230 similarly includes many of the components and features of previously described guardrail system 30. For the embodiment as shown in FIG. 8, guardrail beam 34 has been replaced by guardrail beam 834. Guardrail beam 834 as shown in FIGS. 8 and 10 is sometimes referred to as a Thrie-beam. For some applications, a Thrie-beam guardrail beam may extend along only a portion of the entire system.

A highway guardrail system such as guardrail system 30, partially shown in FIGS. 1 and, 1A, will typically be installed along the side of a highway or roadway adjacent to a hazard to prevent a vehicle from leaving the highway or roadway. Guardrail system 30 preferably includes guardrail beams 34 mounted on a plurality of support posts 214 of end terminal assembly 200. End terminal assembly 200 is preferably installed at one end of guardrail system 330 facing oncoming traffic, and includes end terminal head 174 that is configured to absorb energy by deforming guardrail beam 34 as it moves in a substantially axial direction along guardrail beam 34.

For purposes of describing various features, posts 214 have been designated 214a, 214b and 214c. The number of posts 214 and the length of guardrail beams 34 depends upon the length and other characteristics associated with the hazard adjacent to the highway or roadway requiring installation of guardrail system 330.

Various components associated with end terminal assembly 200 are shown in FIG. 9 These components include anchor assembly 170 and an appropriate number of support posts 214 and guardrail beams 34 as required to satisfactorily install end terminal assembly 200. End terminal assembly 200 is provided to minimize or eliminate the potential for a serious accident from a head on collision with the upstream end of guardrail facing oncoming traffic. End terminal assembly 200 preferably includes kinetic energy absorbing assembly 210 that prevents end 70a of guardrail beam 34 from piercing the vehicle and passenger compartment or causing the vehicle to either roll over or vault guardrail system 30. See FIG. 1. In the event of a collision between a vehicle and the end of guardrail system 30, kinetic energy absorbing assembly 210 dissipates the impact energy of the vehicle without creating an unduly dangerous condition.

As shown in FIG. 9, posts 214a, 214b, and 214c are made from wood or other suitable types of breakaway material. The types of material which may be satisfactorily used to manufacture posts with desired strength and/or breakaway characteristics appropriate for the specific guardrail system, location of each post and roadside hazard include but are not limited to wood, steel, composite materials and various types of plastics.

Steel foundation tubes 226 may be placed in the ground adjacent to the shoulder of the highway at the desired location for end terminal assembly 200. Posts 214a, 214b, and 214c are then inserted into their respective foundation tubes 226. Various techniques which are well known in the art may be used to satisfactorily install foundation tubes 226 and posts 214 depending upon the type of soil conditions and other factors associated with the highway and the hazard requiring installation of guardrail system 30. In addition to foundation tubes 226, other types of post-to-ground installation systems such as concrete with steel slip base posts and direct drive breakaway posts may be satisfactory used with end terminal assembly 200.

For some applications, end terminal assembly 200 may include eight wooden posts 214 respectively installed in eight foundation tubes 226. Other applications may require the use of only four wooden posts 214 respectively installed in four foundation tubes 226. The remaining posts associated with guardrail system 30 will typically be installed adjacent to the highway without the use of foundation tubes 226. These additional posts may be made from wood, steel, composite materials or any other suitable material.

First post 214a is connected to guardrail beam 34 adjacent to the upstream end 70a of the section of the guardrail beam located at the end of the guardrail system 30, that is facing oncoming traffic. Kinetic energy absorbing assembly 210 is preferably integrally engaged with the end 70a of guardrail 34 adjacent to first post 214a. See FIGS. 1 and 9. Second post 214b is connected to guardrail 34 spaced longitudinally from first post 214a with block 232 disposed there-between. Similar blocks 232 are preferably disposed between post 214c and the other posts used to support guardrail beam 34. During a rail face impact between a vehicle and guardrail beam 34 downstream from end terminal assembly 200, blocks 232 provide a lateral offset between their respective posts 214 and guardrail 34. The distance and direction of the lateral offset is selected to prevent the wheels of a vehicle from striking one or more support posts during a rail face impact. Thus, second post 214b is preferably installed longitudinally spaced from first post 214a and laterally offset from guardrail 34 away from the traffic flow.

As shown in FIG. 9, holes 220 are preferably formed in posts 214a, 214b, 214c, and any other posts associated with end terminal assembly 200 to help provide desired breakaway characteristics required for the specific guardrail system 30. Holes 220 in posts 214a, 214b, and 214c should be aligned parallel with the adjacent highway. As previously noted, posts 214a, 214b, and 214c are preferably inserted into steel foundation tubes 226 which cooperate with holes 220 to establish uniform breakaway characteristics for the respective posts 214a, 214b, and 214c.

Guardrail system 30 is primarily designed and installed along a highway to withstand a guardrail face impact from a vehicle downstream from end terminal assembly 200. Anchor assembly 170 including cable 172, a cable anchor bracket and strut 176 are included as a part of end terminal assembly 200 to provide the desired amount of tension support or anchoring for guardrail 34 during such rail face impact from an downstream vehicle collision. Cable 172 is preferably a breakaway type cable associated with highway guardrail systems and is selected to provide desired tension strength for guardrail 34 during such guardrail face impact.

One end of cable 172 is preferably secured with first post 214a using plate 178 and secured by a nut. The opposite end of cable 172 is preferably secured to the cable anchor bracket. A plurality of tabs 184 extend outwardly at an acute angle from the cable anchor bracket to releasably anchor the opposite end of cable 172 with a plurality of apertures formed in guardrail beam 34 between first post 214a and second post 214b. Strut 176 is preferably installed between and connected to first post 214a and second post 214b to provide additional structural support for cable 172 and guardrail beam 34 during downstream guardrail face impacts.

For purposes of illustrating some of its features, end terminal assembly 200 is shown in conjunction with a plurality of guardrail beams 34. Each guardrail beam 34 has a generally W-shaped cross section, some of which may include edge folds or edge curls 52 and 54 rather than the blade edges of the standard W-Beam shape in common use today. For some applications, guardrail beams 34 may be installed along substantially the full length of guardrail system 30. For other applications, guardrail beams 34 may only be installed as part of end terminal assembly 200. Other portions of guardrail system 30 may be formed from various types of guardrail beams such as conventional heavy gauge W-beams or may include multiple strands of twisted cable.

Guardrail beams 34 may be secured to posts 214 through a plurality of releasable fasteners 37 in slots 39 of guardrail beam 34. Similarly, adjacent guardrail beams 34 may be coupled with one another by a plurality of splice bolts 36 extending through respective splice bolt slots 38 of guardrail beams 34. The number, size and configuration of bolts 36 and 37, and slots 38 and 39 may be modified as required for guardrail system 30. For one embodiment, the configuration of slots 38 and 39 and bolts 36 and 37 comply with American Association of State Highway Transportation Officials (AASHTO) Designation 180-89. Suitable hardware, including nuts and washers may be provided to secure bolts 36 and 37. Still other embodiments include visual markings that help the installer, or that help the inspector to assess the adequacy of the installation. In another embodiment, the releasing member is painted or otherwise configured to include a reflective capability for added safety along a roadway, or to help in quickly identifying releasing members that have already been activated along a roadway. Various other mechanical fastening techniques and components may also be used.

FIG. 10 shows in isometric view with portions cut away, a crash cushion 100 installed along a roadway for the purpose of safely protecting errant motorists from a hard obstacle at end 112 of crash cushion 100. Crash cushion 100 is bolted to a foundation at foundation supports 104 in order to secure crash cushion 100 to the roadway. Crash cushion 100 includes impact head 114 for receiving head-on impacts from errant vehicles. Upon receiving such a head-on impact by a vehicle, rectangular support frames 120 of crash cushion 100 slide along in the direction of traffic, thereby crushing the crushable rectangular boxes 108 in order to absorb kinetic energy form the errant vehicle. During such an impact, overlapping Thrie-Beam panels 118 on each side of crash cushion 100 must release (in a direction transverse to the long axis of the installed crash cushion 100) from their secured positions at rectangular support frames 120 using releasable fasteners of the present invention 37. Upon release, the "Thrie-Beam" panels are guided by guide members in slots of the Thrie-Beam panels (guide members and slots not expressly shown) so that impact head 114 may move toward end 112 as the crushable rectangular boxes 108 are compressed in succession by the forces of the impacting vehicle. In the case of a side impact to crash cushion 100, the Thrie-Beam panels 118 become the impact absorbing members, and release of releasable fasteners 37 serves to keep each Thrie-Beam panel from remaining pinned to rectangular support frames 120 during an impact. This is desirable in order to avoid excessive stresses in the Thrie-Beam panels during a side impact event.

The components described herein facilitate the retrofit and/or replacement of existing guardrail systems with one or more guardrail systems in accordance with teachings of the present invention without requiring substantial modifications to existing equipment or to other portions of each system.

Although the present invention has been described by several embodiments, various changes and modifications may be suggested to one skilled in the art. It is intended that the present invention encompasses such changes and modifications as fall within the scope of the present appended claims.

What is claimed is:

1. A structural safety system to absorb energy from an errant vehicle, comprising:
   at least one support;
   at least one vehicle impact absorbing member, each said vehicle impact absorbing member having at least one elongated opening, each said opening corresponding to a respective said support and longitudinally extending along a longitudinal length of said vehicle impact absorbing member;
   at least one securing member, each said securing member passing through a respective said opening in one of said vehicle impact absorbing members and supported on a respective said support;

each said securing member comprising a head and a shaft extending from said head, said shaft comprising an end and supported on a respective said support and a positioning member adjacent said head, said positioning member having an oblong cross-sectional shape having opposing apexes, and said head having opposing perimeter edges diametrically aligned with and disposed at or offset radially inward from said opposing apexes; and a longitudinally extending edge portion of each said opening defining a releasing member for releasing said vehicle impact absorbing member from said support during a vehicle impact, said edge portion of said opening deformed by said head of a respective said securing member during a vehicle impact; and said positioning member of each said securing member extending through a respective said opening such that said opposing apexes of said positioning member are longitudinally aligned within said opening, said opposing perimeter edges of said head of said securing member each being spaced between opposing longitudinal ends of said opening, regardless of the longitudinal position of said positioning member within said opening, thereby preventing each opposing perimeter edge of said securing member from overlapping or engaging said longitudinal ends of said opening during release of said vehicle impact absorbing member from said support and enabling said opening to deform and pass said head of said securing member through said opening to release said impact absorbing member from said support.

2. A structural safety system as defined in claim 1, wherein the positioning member centers the securing member in the opening in the vehicle impact absorbing member.

3. A structural safety system as defined in claim 1, wherein the positioning member is integral with the securing member.

4. A structural safety system as defined in claim 1, wherein the positioning member includes a tapered front edge for engagement with at least one edge of the openings in the vehicle impact absorbing member.

5. A structural safety system as defined in claim 1, wherein the vehicle impact absorbing member is one of a w-beam, and a thrie-beam.

6. A structural safety system including a fastening system including a vehicle impact absorbing member and a support, said vehicle impact absorbing member having an elongated opening, said opening longitudinally extending along a longitudinal length of said vehicle impact absorbing member, comprising:

a securing member for securing the vehicle impact absorbing member to the support, said securing member passing through said opening in said vehicle impact absorbing member and supported on said support;

said securing member comprising a head and a shaft extending from said head, said shaft comprising an end supported on said support and a positioning member adjacent said head, said positioning member having an oblong cross-sectional shape having opposing apexes, and said head having opposing perimeter edges diametrically aligned with and disposed at or offset radially inward from said opposing apexes; and a longitudinally extending edge portion of said opening defining a releasing member for releasing said vehicle impact absorbing member from said support during a vehicle impact, said edge portion of said opening deformed by said head of said securing member during a vehicle impact; and said positioning member of said securing member extending through said opening such that said opposing apexes of said positioning member are longitudinally aligned within said opening, said opposing perimeter edges of said head of said securing member each being spaced between opposing longitudinal ends of said opening, regardless of the longitudinal position of said positioning member within said opening, thereby preventing each opposing perimeter edge of said securing member from overlapping or engaging said longitudinal ends of said opening during release of said vehicle impact absorbing member from said support and enabling said opening to deform and pass said head of said securing member through said opening to release said impact absorbing member from said support.

7. A structural safety system as defined in claim 6, wherein the positioning member is integral with the securing member.

8. A structural safety system as defined in claim 6, wherein the positioning member includes a tapered front edge for engagement with at least one edge of the one of the openings in the vehicle impact absorbing member and the support.

9. A structural safety system as defined in claim 6, wherein the vehicle impact absorbing member is one of a w-beam and a thrie-beam.

10. A highway safety structural system positioned along a roadway to attenuate the energy of an impact of an errant vehicle, comprising:

at least one vertical support;

at least one vehicle impact member, each said vehicle impact member having at least one elongated opening, each said opening corresponding to a respective said support and longitudinally extending along a longitudinal length of said vehicle impact member;

at least one securing member, each said securing member passing through a respective said opening in one of said vehicle impact members and supported on a respective said support;

each said securing member comprising a head and a shaft extending from said head, said shaft comprising an end supported on a respective said support and a positioning member adjacent said head, said positioning member having an oblong cross-sectional shape having opposing apexes, and said head having opposing perimeter edges diametrically aligned with and disposed at or offset radially inward from said opposing apexes; and a longitudinally extending edge portion of each said opening defining a releasing member for releasing the vehicle impact member from the support during a vehicle impact, said edge portion of said opening deformed by said head of a respective said securing member during a vehicle impact; and said positioning member of each said securing member extending through a respective said opening such that said opposing apexes of said positioning member are longitudinally aligned within said opening, said opposing perimeter edges of said head of said securing member each being spaced between opposing longitudinal ends of said opening, regardless of the longitudinal position of said positioning member within said opening, thereby preventing each opposing perimeter edge of said securing member from overlapping or engaging said longitudinal ends of said opening during release of said vehicle impact member from said support and enabling said opening to deform and pass said head of said securing member through said opening to release said impact member from said support.

11. A highway safety structural system as defined in claim 10, wherein a front edge of the positioning member facing the support is curved.

12. A highway safety structural system as defined in claim 10, wherein the positioning member is integral with the securing member.

13. A highway safety structural system as defined in claim 10, wherein the positioning member includes a tapered front edge for engagement with at least one edge of the one of the openings in the vehicle impact member and the support.

14. A highway safety structural system as defined in claim 10, wherein the vehicle impact member is one of a w-beam and a thrie-beam.

* * * * *